United States Patent
Sepulveda et al.

(10) Patent No.: US 11,182,737 B2
(45) Date of Patent: Nov. 23, 2021

(54) SYSTEMS AND METHODS FOR FACTORY CATALOG MANAGEMENT AND DISTRIBUTION OF ORDERS AND SERVICES

(71) Applicant: VVC HOLDING CORPORATION, Seattle, WA (US)

(72) Inventors: Donald Sepulveda, Houston, TX (US); Sridhar Ramachandran, Seattle, WA (US); Serene Munroe, Seattle, WA (US)

(73) Assignee: VVC Holding Corp., Watertown, WA (US)

( * ) Notice: Subject to any disclaimer, the term of this patent is extended or adjusted under 35 U.S.C. 154(b) by 426 days.

(21) Appl. No.: 15/978,088

(22) Filed: May 11, 2018

(65) Prior Publication Data

US 2018/0330317 A1    Nov. 15, 2018

Related U.S. Application Data

(60) Provisional application No. 62/505,695, filed on May 12, 2017.

(51) Int. Cl.
- *G06Q 10/08* (2012.01)
- *H04L 29/08* (2006.01)
- *G06F 16/23* (2019.01)
- *G06Q 10/10* (2012.01)

(52) U.S. Cl.
CPC .......... *G06Q 10/087* (2013.01); *G06F 16/23* (2019.01); *H04L 67/1097* (2013.01)

(58) Field of Classification Search
CPC .... G06Q 10/087; G06F 16/23; H04L 67/1097
USPC ........................................................ 705/28
See application file for complete search history.

(56) References Cited

U.S. PATENT DOCUMENTS

| | | | |
|---|---|---|---|
| 2004/0153868 A1* | 8/2004 | Nonaka ................. | G06Q 10/10 714/47.2 |
| 2008/0306973 A1* | 12/2008 | Richard ................ | G06F 16/254 |
| 2012/0129503 A1* | 5/2012 | Lindeman ............. | H04W 12/37 455/414.1 |
| 2014/0013337 A1* | 1/2014 | Nett ........................ | G06F 9/541 719/314 |
| 2017/0132892 A1* | 5/2017 | Vargas ............... | G06K 19/0723 |

* cited by examiner

*Primary Examiner* — Garcia Ade
(74) *Attorney, Agent, or Firm* — GTC Law Group PC & Affiliates

(57) ABSTRACT

Certain examples provide systems and methods for cloud-based factory storage and provisioning of orders and other items. An example cloud-based factory catalog apparatus is disclosed including a data store to include reference content, rules, and tenant content; a processor to map incoming tenant content to the reference content to form a catalog content set and to store the catalog content set in the data store to be output to at least one tenant system; and an interface to receive the incoming tenant content and provide the catalog content set to the at least one tenant system. An example computer-readable storage medium is disclosed including instructions which, when executed, particularly configure at least one processor to at least: map incoming tenant content to reference content using rules to form a catalog content set; store the catalog content set in a data store; and provide the catalog content set to at least one tenant system.

14 Claims, 23 Drawing Sheets

| Id | 1 |
|---|---|
| Name | Basic Metabolic Panel |
| Short Name | BMP |
| Code | 24321-2 |
| Code Description | Basic metabolic 2000 panel - Serum or Plasma |
| Coding System & Version | LOINC_2.0_LoincUniversalLabOrdersValueSet |
| Code Purpose (Default) | REQUEST |
| Service Provider | <null> |
| Source(?) version of .csv file | |
| Orderable Item Type | Lab |
| Requirement Type | <null> |
| Requirement Text | <null> |
| Requirement Type | <null> |
| Requirement Text | <null> |

FIG. 5A

|  | 2 | 3 |
|---|---|---|
| Name | Basic Metabolic Panel | Basic Metabolic Panel |
| Short Name | <null> | <null> |
| Code | 322758 | 10165F |
| Code Description | Basic Metabolic Panel (8) | Basic Metabolic Panel |
| Coding System & Version | Lab Corp | Quest Lab |
| Code Purpose (Default) | REQUEST | REQUEST |
| Service Provider | Lab Corp | Quest Lab |
| Source(?) version of .csv file |  |  |
| Orderable Item Type | <null> | <null> |
| Requirement Type | <null> | Specimen Requirements |
| Requirement Text | <null> | Room Temperature |
| Requirement Type | <null> | Transport Temperature |
| Requirement Text | <null> | OLY |

| | A | B | C | D | E | F | G |
|---|---|---|---|---|---|---|---|
| | Generic Data from GE Informatics Team | Lab Corp Content | Quest Content | CHC Content | CHC Content | CHC Content cuts CHC to common order kind of codes | CHC Content |
| Name | Basic Metabolic Panel | Basic Metabolic Panel | Basic Metabolic Panel | Basic Metabolic Panel | Basic Metabolic Panel | Basic Metabolic Panel | Basic Metabolic Panel |
| Short Name | BMP | <nil> | <nil> | <nil> | <nil> | <nil> | <nil> |
| Order Code Description | Basic metabolic 2000 panel - Serum or Plasma | Basic Metabolic Panel (8) | Basic Metabolic Panel | Basic Metabolic Panel | Basic Metabolic Panel | BASIC METABOLIC PANEL (BMP) | |
| Code | 24323-2 | 322758 | 10185F | 20283000 | 10185 | 37014 | BD848 |
| Coding System | LOINC | Lab Corp | Quest Lab | RML | Quest Lab | Quest Lab | CPT |
| Code Purpose | Request | Request | Request | Request | Request | Request | Billing |
| Service Provider | <nil> | Lab Corp | Quest Lab | RML | Quest Lab-WA | Quest Lab-WA | <nil> |

FIG. 16

| <validate> | | <reaction> |
|---|---|---|
| If Orderable Item Id does not match any Orderable Item record | | insert ID, Name, ShortName, StartDate, EndDate <successful import> |
| If Orderable Item Id matches | has start date changed? | <error> Orderable Item StartDate is changed! |
| | was end date different than 12/31/9999 in persisted record and is it changed now to some other date? | <error> <You cannot re-activate an expired orderable item !> |
| | no change in start date and allowable end date | update Name, ShortName, EndDate <successful import> |
| If Orderable Item Order Code Id does not match | if <fk> is not valid fk <fk> Orderable Item Id, Code Purpose Id, Coding System Id | <error> <fk> does not exist in the database! |
| | if <fk> is valid fk | insert CodePurpose, Provider, CodingSystem, Code, CodeDescription, StartDate, EndDate <successful import> |
| If Orderable Item Order Code Id matches | if <fk> is not valid fk <fk> Orderable Item Id, Code Purpose Id, Coding System Id | <error> <fk> does not exist in the database! |
| | has start date changed? | <error> OrderCodeStartDate is changed! |
| | was end date different than 12/31/9999 in persisted record and is it changed now to some other date? | <error> <You cannot re-activate an expired orderable item order code!> |
| | <fk> reconciled, no change in start date and allowable end date | update CodePurpose, Provider, CodingSystem, Code, CodeDescription, EndDate <successful import> |
| If Orderable Item Orderable Item Type Id does not match | if <fk> is not valid fk <fk> Orderable Item Id, OrderableItemTypeID | |
| | if <fk> is valid fk | insert TypeID, StartDate, EndDate <successful import> |
| If Orderable Item Orderable Item Type Id matches | if <fk> is not valid fk <fk> Orderable Item Id, OrderableItemTypeID | |
| | has start date changed? | <error> Start date has changed! |
| | was end date different than 12/31/9999 and is it changed now? | <error> <You cannot re-activate an expired !> |
| | <fk> reconciled, no change in start date and allowable end date | update TypeID, EndDate <successful import> |

FIG. 17

| table | Column | default data |
|---|---|---|
| Orderable Item | End date | 12/31/9999 |
| | Has Published to Production | 1 |
| | Published to production date time | current date |
| | start date | current date |
| | short name if null | copy name into short name |
| | created by and updated by user | 1 |
| | Provider Id | <null> |

FIG. 18

SYSTEMS AND METHODS FOR FACTORY CATALOG MANAGEMENT AND DISTRIBUTION OF ORDERS AND SERVICES

CROSS-REFERENCE TO RELATED APPLICATIONS

This patent arises from an application that claims the benefit of U.S. Provisional Patent Application Ser. No. 62/505,695, which was filed on May 12, 2017. U.S. Provisional Patent Application Ser. No. 62/505,695 is hereby incorporated herein by reference in its entirety. Priority to U.S. Provisional Patent Application Ser. No. 62/505,695 is hereby claimed.

TECHNICAL FIELD

This disclosure relates generally to a factory catalog platform infrastructure and, more particularly to generating and providing program code, interfaces, extensions, applications, and/or other content via a catalog content set via a factory catalog platform infrastructure.

BACKGROUND

Prior efforts to distribute content occur haphazardly and require much manual effort. Prior cloud-based content shepherding involves storage but not much else. Modification of the content involved particular adjustments made without an infrastructure to support efforts on a more transformative scale. Hardware, software, and infrastructure configuration have been lacking. There is a need for improved hardware and software to form a platform infrastructure lacking in the art.

BRIEF DESCRIPTION

Certain examples provide a cloud-based factory catalog apparatus including a data store to include reference content, rules, and tenant content; a processor to map incoming tenant content to the reference content to form a catalog content set and to store the catalog content set in the data store to be output to at least one tenant system; and an interface to receive the incoming tenant content and provide the catalog content set to the at least one tenant system.

Certain examples provide a computer-readable storage medium including instructions which, when executed, particularly configure at least one processor to at least: map incoming tenant content to reference content using rules to form a catalog content set; store the catalog content set in a data store; and provide the catalog content set to at least one tenant system.

Certain examples provide a method to provide cloud-based factory catalog management and distribution of at least one of orders or services. The example method includes mapping, by executing an instruction using at least one processor, incoming tenant content to reference content using rules to form a catalog content set; storing, by executing an instruction using the at least one processor, the catalog content set in a data store; and providing, by executing an instruction using the at least one processor, the catalog content set to at least one tenant system.

BRIEF DESCRIPTION OF THE DRAWINGS

The features and technical aspects of the system and method disclosed herein will become apparent in the following Detailed Description set forth below when taken in conjunction with the drawings in which like reference numerals indicate identical or functionally similar elements.

FIGS. 5A-6 illustrate example order items provisionable via the example cloud platform of FIGS. 4A-4B.

FIGS. 9-15 illustrate example interfaces for access to content in the cloud factory.

FIG. 16 illustrates an example file including tabs for imported content.

FIGS. 17-18 illustrate example validation tables.

DETAILED DESCRIPTION

Figure 1:
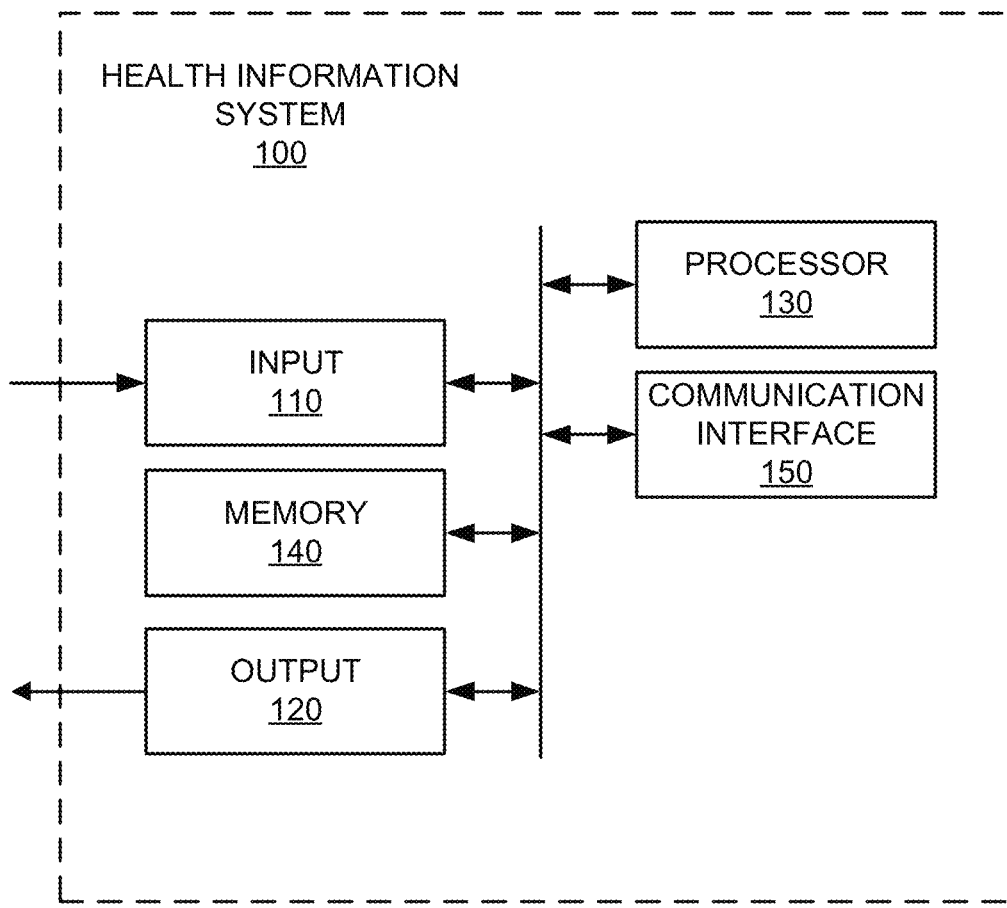
FIG. 1 shows a block diagram of an example healthcare-focused information system.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

I. Overview

Certain examples provide a central, cloud-based factory catalog of items, orders, services, etc., managed and provided by a provider to one or more customers. For example, a central, cloud-based catalog of items, services, etc., that are orderable by a provider is linked to an appropriate terminology set for the item being ordered. For example, Lab orderables link to Logical Observation Identifiers Names and Codes (LOINC) codes and Current Procedural Terminology (CPT)-4 Codes, Imaging Orders, Procedure Orders, Service Orders, Medications being prescribed or administered, Immunizations and Referrals, etc., all link to clinical terminology data sets that are used by healthcare practitioners for reporting and charging. Additionally, the factory catalog maintains and links service providers that could see a patient to their national provider identification records. The owner/manager of the factory catalog maintains the validity and currency of these tables for customers to reference so that they do not have to maintain the tables/linkages themselves. The factory catalog allows for customers to choose the set of items they want to use, what they want to call these item(s), and how the item(s) should behave in their practice setting (e.g., their cloud tenant, etc.).

Certain examples provide a "standard" factory set of lab orderable items. Content includes order lists, etc. Order lists can be created individually, for groups/teams, for an organization, for a provider, etc. Content can be maintained, curated, and provided by an owner and/or manager of the factory (e.g., a cloud-based order factory platform, etc.). Example content includes generic lab order codes (and/or other order codes such as procedure orders, prescription orders, equipment/medical device orders, exam orders, referral orders, etc.). Example content includes lab order codes as received from vendors mapped to the generic lab order codes. Content in the factory can be provided as a source for all tenants of the factory cloud provider and/or manager, for example.

As will be described further below, certain examples can integrate with and operate in a variety of healthcare environments and impact a variety of healthcare scenarios and data through sensing, decision support, workflow management, and control. The following section provides some context and example environment for the presently disclosed technology described further in the subsequent section below.

II. Example Operating Environments

Health information, also referred to as healthcare information and/or healthcare data, relates to information generated and/or used by a healthcare entity. Health information can be information associated with health of one or more patients, for example. Health information may include protected health information (PHI), as outlined in the Health Insurance Portability and Accountability Act (HIPAA), which is identifiable as associated with a particular patient and is protected from unauthorized disclosure. Health information can be organized as internal information and external information. Internal information includes patient encounter information (e.g., patient-specific data, aggregate data, comparative data, etc.) and general healthcare operations information, etc. External information includes comparative data, expert and/or knowledge-based data, etc. Information can have both a clinical (e.g., diagnosis, treatment, prevention, etc.) and administrative (e.g., scheduling, billing, management, etc.) purpose.

Institutions, such as healthcare institutions, having complex network support environments and sometimes chaotically driven process flows utilize secure handling and safeguarding of the flow of sensitive information (e.g., personal privacy). A need for secure handling and safeguarding of information increases as a demand for flexibility, volume, and speed of exchange of such information grows. For example, healthcare institutions provide enhanced control and safeguarding of the exchange and storage of sensitive patient PHI and employee information between diverse locations to improve hospital operational efficiency in an operational environment typically having a chaotic-driven demand by patients for hospital services. In certain examples, patient identifying information can be masked or even stripped from certain data depending upon where the data is stored and who has access to that data. In some examples, PHI that has been "de-identified" can be re-identified based on a key and/or other encoder/decoder.

A healthcare information technology infrastructure can be adapted to service multiple business interests while providing clinical information and services. Such an infrastructure may include a centralized capability including, for example, a data repository, reporting, discrete data exchange/connectivity, "smart" algorithms, personalization/consumer decision support, etc. This centralized capability provides information and functionality to a plurality of users including medical devices, electronic records, access portals, pay for performance (P4P), chronic disease models, and clinical health information exchange/regional health information organization (HIE/RHIO), and/or enterprise pharmaceutical studies, home health, for example.

Interconnection of multiple data sources helps enable an engagement of all relevant members of a patient's care team and helps improve an administrative and management burden on the patient for managing his or her care. Particularly, interconnecting the patient's electronic medical record and/or other medical data can help improve patient care and management of patient information. Furthermore, patient care compliance is facilitated by providing tools that automatically adapt to the specific and changing health conditions of the patient and provide comprehensive education and compliance tools to drive positive health outcomes.

In certain examples, healthcare information can be distributed among multiple applications using a variety of database and storage technologies and data formats. To provide a common interface and access to data residing across these applications, a connectivity framework (CF) can be provided which leverages common data and service models (CDM and CSM) and service oriented technologies, such as an enterprise service bus (ESB) to provide access to the data.

In certain examples, a variety of user interface frameworks and technologies can be used to build applications for health information systems including, but not limited to, MICROSOFT® ASP.NET, AJAX®, MICROSOFT® Windows Presentation Foundation, GOOGLE® Web Toolkit, MICROSOFT® Silverlight, ADOBE®, and others. Applications can be composed from libraries of information widgets to display multi-content and multi-media information, for example. In addition, the framework enables users to tailor layout of applications and interact with underlying data.

In certain examples, an advanced Service-Oriented Architecture (SOA) with a modern technology stack helps provide robust interoperability, reliability, and performance. Example SOA includes a three-fold interoperability strategy including a central repository (e.g., a central repository built from Health Level Seven (HL7) transactions), services for working in federated environments, and visual integration with third-party applications. Certain examples provide portable content enabling plug 'n play content exchange among healthcare organizations. A standardized vocabulary using common standards (e.g., LOINC, SNOMED CT, RxNorm, FDB, ICD-9, ICD-10, etc.) is used for interoperability, for example. Certain examples provide an intuitive user interface to help minimize end-user training. Certain examples facilitate user-initiated launching of third-party applications directly from a desktop interface to help provide a seamless workflow by sharing user, patient, and/or other contexts. Certain examples provide real-time (or at least substantially real time assuming some system delay) patient data from one or more information technology (IT) systems and facilitate comparison(s) against evidence-based best practices. Certain examples provide one or more dashboards for specific sets of patients. Dashboard(s) can be based on condition, role, and/or other criteria to indicate variation(s) from a desired practice, for example.

A. Example Healthcare Information System

An information system can be defined as an arrangement of information/data, processes, and information technology that interact to collect, process, store, and provide informational output to support delivery of healthcare to one or more patients. Information technology includes computer technology (e.g., hardware and software) along with data and telecommunications technology (e.g., data, image, and/or voice network, etc.).

Turning now to the figures, FIG. 1 shows a block diagram of an example healthcare-focused information system 100. Example system 100 can be configured to implement a variety of systems and processes including image storage (e.g., picture archiving and communication system (PACS), etc.), image processing and/or analysis, radiology reporting and/or review (e.g., radiology information system (RIS), etc.), computerized provider order entry (CPOE) system, clinical decision support, patient monitoring, population health management (e.g., population health management system (PHMS), health information exchange (HIE), etc.), healthcare data analytics, cloud-based image sharing, electronic medical record (e.g., electronic medical record system (EMR), electronic health record system (EHR), electronic patient record (EPR), personal health record system (PHR), etc.), and/or other health information system (e.g., clinical information system (CIS), hospital information system (HIS), patient data management system (PDMS), laboratory information system (LIS), cardiovascular information system (CVIS), etc.

As illustrated in FIG. 1, the example information system 100 includes an input 110, an output 120, a processor 130, a memory 140, and a communication interface 150. The components of example system 100 can be integrated in one device or distributed over two or more devices.

Example input 110 may include a keyboard, a touch-screen, a mouse, a trackball, a track pad, optical barcode recognition, voice command, etc. or combination thereof used to communicate an instruction or data to system 100. Example input 110 may include an interface between systems, between user(s) and system 100, etc.

Example output 120 can provide a display generated by processor 130 for visual illustration on a monitor or the like. The display can be in the form of a network interface or graphic user interface (GUI) to exchange data, instructions, or illustrations on a computing device via communication interface 150, for example. Example output 120 may include a monitor (e.g., liquid crystal display (LCD), plasma display, cathode ray tube (CRT), etc.), light emitting diodes (LEDs), a touch-screen, a printer, a speaker, or other conventional display device or combination thereof.

Example processor 130 includes hardware and/or software configuring the hardware to execute one or more tasks and/or implement a particular system configuration. Example processor 130 processes data received at input 110 and generates a result that can be provided to one or more of output 120, memory 140, and communication interface 150. For example, example processor 130 can take user annotation provided via input 110 with respect to an image displayed via output 120 and can generate a report associated with the image based on the annotation. As another example, processor 130 can process imaging protocol information obtained via input 110 to provide an updated configuration for an imaging scanner via communication interface 150.

Example memory 140 may include a relational database, an object-oriented database, a data dictionary, a clinical data repository, a data warehouse, a data mart, a vendor neutral archive, an enterprise archive, etc. Example memory 140 stores images, patient data, best practices, clinical knowledge, analytics, reports, etc. Example memory 140 can store data and/or instructions for access by the processor 130. In certain examples, memory 140 can be accessible by an external system via the communication interface 150.

Example communication interface 150 facilitates transmission of electronic data within and/or among one or more systems. Communication via communication interface 150 can be implemented using one or more protocols. In some examples, communication via communication interface 150 occurs according to one or more standards (e.g., Digital Imaging and Communications in Medicine (DICOM), Health Level Seven (HL7), ANSI X12N, etc.). Example communication interface 150 can be a wired interface (e.g., a data bus, a Universal Serial Bus (USB) connection, etc.) and/or a wireless interface (e.g., radio frequency, infrared (IR), near field communication (NFC), etc.). For example, communication interface 150 may communicate via wired local area network (LAN), wireless LAN, wide area network (WAN), etc. using any past, present, or future communication protocol (e.g., BLUETOOTH™, USB 2.0, USB 3.0, etc.).

In certain examples, a Web-based portal may be used to facilitate access to information, protocol library, imaging system configuration, patient care and/or practice management, etc. Information and/or functionality available via the Web-based portal may include one or more of order entry, laboratory test results review system, patient information, clinical decision support, medication management, scheduling, electronic mail and/or messaging, medical resources, etc. In certain examples, a browser-based interface can serve as a zero footprint, zero download, and/or other universal viewer for a client device.

In certain examples, the Web-based portal serves as a central interface to access information and applications, for example. Data may be viewed through the Web-based portal or viewer, for example. Additionally, data may be manipulated and propagated using the Web-based portal, for example. Data may be generated, modified, stored and/or used and then communicated to another application or system to be modified, stored and/or used, for example, via the Web-based portal, for example.

The Web-based portal may be accessible locally (e.g., in an office) and/or remotely (e.g., via the Internet and/or other private network or connection), for example. The Web-based portal may be configured to help or guide a user in accessing data and/or functions to facilitate patient care and practice management, for example. In certain examples, the Web-based portal may be configured according to certain rules, preferences and/or functions, for example. For example, a user may customize the Web portal according to particular desires, preferences and/or requirements.

B. Example Healthcare Infrastructure

Figure 2:
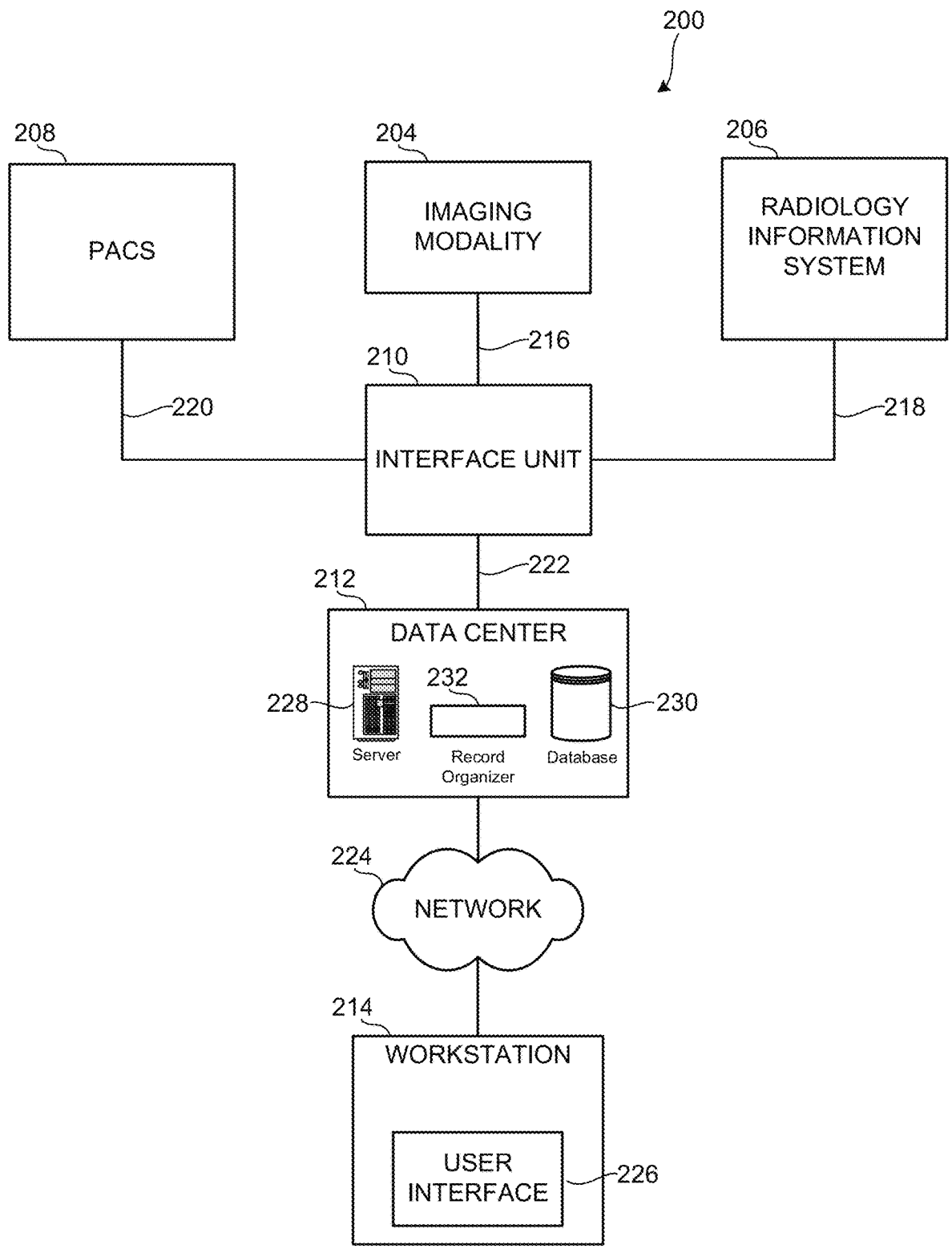
FIG. 2 shows a block diagram of an example healthcare information infrastructure.

FIG. 2 shows a block diagram of an example healthcare information infrastructure 200 including one or more subsystems such as the example healthcare-related information system 100 illustrated in FIG. 1. Example healthcare system 200 includes an imaging modality 204, a RIS 206, a PACS 208, an interface unit 210, a data center 212, and a workstation 214. In the illustrated example, scanner/modality 204, MS 206, and PACS 208 are housed in a healthcare facility and locally archived. However, in other implementations, imaging modality 204, MS 206, and/or PACS 208 may be housed within one or more other suitable locations. In certain implementations, one or more of PACS 208, MS 206, modality 204, etc., may be implemented remotely via a thin client and/or downloadable software solution. Furthermore, one or more components of the healthcare system 200 can be combined and/or implemented together. For example, MS 206 and/or PACS 208 can be integrated with the imaging scanner 204; PACS 208 can be integrated with MS 206; and/or the three example systems 204, 206, and/or 208 can be integrated together. In other example implementations, healthcare system 200 includes a subset of the illustrated systems 204, 206, and/or 208. For example, healthcare system 200 may include only one or two of the modality 204, MS 206, and/or PACS 208. Information (e.g., scheduling, test results, exam image data, observations, diagnosis, etc.) can be entered into the scanner 204, MS 206, and/or PACS 208 by healthcare practitioners (e.g., radiologists, physicians, and/or technicians) and/or administrators before and/or after patient examination. One or more of the imaging scanner 204, RIS 206, and/or PACS 208 can communicate with equipment and system(s) in an operating room, patient room, etc., to track activity, correlate information, generate reports and/or next actions, and the like.

The RIS 206 stores information such as, for example, radiology reports, radiology exam image data, messages, warnings, alerts, patient scheduling information, patient demographic data, patient tracking information, and/or physician and patient status monitors. Additionally, RIS 206 enables exam order entry (e.g., ordering an x-ray of a patient) and image and film tracking (e.g., tracking identities of one or more people that have checked out a film). In some examples, information in RIS 206 is formatted according to the HL-7 (Health Level Seven) clinical communication protocol. In certain examples, a medical exam distributor is located in RIS 206 to facilitate distribution of radiology exams to a radiologist workload for review and management of the exam distribution by, for example, an administrator.

PACS 208 stores medical images (e.g., x-rays, scans, three-dimensional renderings, etc.) as, for example, digital images in a database or registry. In some examples, the medical images are stored in PACS 208 using the Digital Imaging and Communications in Medicine (DICOM) format. Images are stored in PACS 208 by healthcare practitioners (e.g., imaging technicians, physicians, radiologists) after a medical imaging of a patient and/or are automatically transmitted from medical imaging devices to PACS 208 for storage. In some examples, PACS 208 can also include a display device and/or viewing workstation to enable a healthcare practitioner or provider to communicate with PACS 208.

The interface unit 210 includes a hospital information system interface connection 216, a radiology information system interface connection 218, a PACS interface connection 220, and a data center interface connection 222. Interface unit 210 facilities communication among imaging modality 204, MS 206, PACS 208, and/or data center 212. Interface connections 216, 218, 220, and 222 can be implemented by, for example, a Wide Area Network (WAN) such as a private network or the Internet. Accordingly, interface unit 210 includes one or more communication components such as, for example, an Ethernet device, an asynchronous transfer mode (ATM) device, an 802.11 device, a DSL modem, a cable modem, a cellular modem, etc. In turn, the data center 212 communicates with workstation 214, via a network 224, implemented at a plurality of locations (e.g., a hospital, clinic, doctor's office, other medical office, or terminal, etc.). Network 224 is implemented by, for example, the Internet, an intranet, a private network, a wired or wireless Local Area Network, and/or a wired or wireless Wide Area Network. In some examples, interface unit 210 also includes a broker (e.g., a Mitra Imaging's PACS Broker) to allow medical information and medical images to be transmitted together and stored together.

Interface unit 210 receives images, medical reports, administrative information, exam workload distribution information, and/or other clinical information from the information systems 204, 206, 208 via the interface connections 216, 218, 220. If necessary (e.g., when different formats of the received information are incompatible), interface unit 210 translates or reformats (e.g., into Structured Query Language ("SQL") or standard text) the medical information, such as medical reports, to be properly stored at data center 212. The reformatted medical information can be transmitted using a transmission protocol to enable different medical information to share common identification elements, such as a patient name or social security number. Next, interface unit 210 transmits the medical information to data center 212 via data center interface connection 222. Finally, medical information is stored in data center 212 in, for example, the DICOM format, which enables medical images and corresponding medical information to be transmitted and stored together.

The medical information is later viewable and easily retrievable at workstation 214 (e.g., by their common identification element, such as a patient name or record number). Workstation 214 can be any equipment (e.g., a personal computer) capable of executing software that permits electronic data (e.g., medical reports) and/or electronic medical images (e.g., x-rays, ultrasounds, MRI scans, etc.) to be acquired, stored, or transmitted for viewing and operation. Workstation 214 receives commands and/or other input from a user via, for example, a keyboard, mouse, track ball, microphone, etc. Workstation 214 is capable of implementing a user interface 226 to enable a healthcare practitioner and/or administrator to interact with healthcare system 200. For example, in response to a request from a physician, user interface 226 presents a patient medical history. In other examples, a radiologist is able to retrieve and manage a workload of exams distributed for review to the radiologist via user interface 226. In further examples, an administrator reviews radiologist workloads, exam allocation, and/or operational statistics associated with the distribution of exams via user interface 226. In some examples, the administrator adjusts one or more settings or outcomes via user interface 226.

Example data center 212 of FIG. 2 is an archive to store information such as images, data, medical reports, and/or, more generally, patient medical records. In addition, data center 212 can also serve as a central conduit to information located at other sources such as, for example, local archives, hospital information systems/radiology information systems (e.g., HIS 204 and/or RIS 206), or medical imaging/storage systems (e.g., PACS 208 and/or connected imaging modalities). That is, the data center 212 can store links or indicators (e.g., identification numbers, patient names, or record numbers) to information. In the illustrated example, data center 212 is managed by an application server provider (ASP) and is located in a centralized location that can be accessed by a plurality of systems and facilities (e.g., hospitals, clinics, doctor's offices, other medical offices, and/or terminals). In some examples, data center 212 can be spatially distant from the imaging modality 204, RIS 206, and/or PACS 208. In certain examples, the data center 212 can be located in the cloud (e.g., on a cloud-based server, an edge device, etc.).

Example data center 212 of FIG. 2 includes a server 228, a database 230, and a record organizer 232. Server 228 receives, processes, and conveys information to and from the components of healthcare system 200. Database 230 stores the medical information described herein and provides access thereto. Example record organizer 232 of FIG. 2 manages patient medical histories, for example. Record organizer 232 can also assist in procedure scheduling, for example.

Certain examples can be implemented as cloud-based clinical information systems and associated methods of use. An example cloud-based clinical information system enables healthcare entities (e.g., patients, clinicians, sites, groups, communities, and/or other entities) to share information via web-based applications, cloud storage and cloud services. For example, the cloud-based clinical information system may enable a first clinician to securely upload information into the cloud-based clinical information system to allow a second clinician to view and/or download the information via a web application. Thus, for example, the first clinician may upload an x-ray imaging protocol into the cloud-based clinical information system, and the second clinician may view and download the x-ray imaging protocol via a web browser and/or download the x-ray imaging protocol onto a local information system employed by the second clinician.

In certain examples, users (e.g., a patient and/or care provider) can access functionality provided by system 200 via a software-as-a-service (SaaS) implementation over a cloud or other computer network, for example. In certain examples, all or part of system 200 can also be provided via platform as a service (PaaS), infrastructure as a service (IaaS), etc. For example, system 200 can be implemented as a cloud-delivered Mobile Computing Integration Platform as a Service. A set of consumer-facing Web-based, mobile, and/or other applications enable users to interact with the PaaS, for example.

C. Industrial Internet Examples

The Internet of things (also referred to as the "Industrial Internet") relates to an interconnection between a device that can use an Internet connection to talk with other devices on the network. Using the connection, devices can communicate to trigger events/actions (e.g., changing temperature, turning on/off, providing a status, etc.). In certain examples, machines can be merged with "big data" to improve efficiency and operations, provide improved data mining, facilitate better operation, etc.

Big data can refer to a collection of data so large and complex that it becomes difficult to process using traditional data processing tools/methods. Challenges associated with a large data set include data capture, sorting, storage, search, transfer, analysis, and visualization. A trend toward larger data sets is due at least in part to additional information derivable from analysis of a single large set of data, rather than analysis of a plurality of separate, smaller data sets. By analyzing a single large data set, correlations can be found in the data, and data quality can be evaluated.

Figure 3:
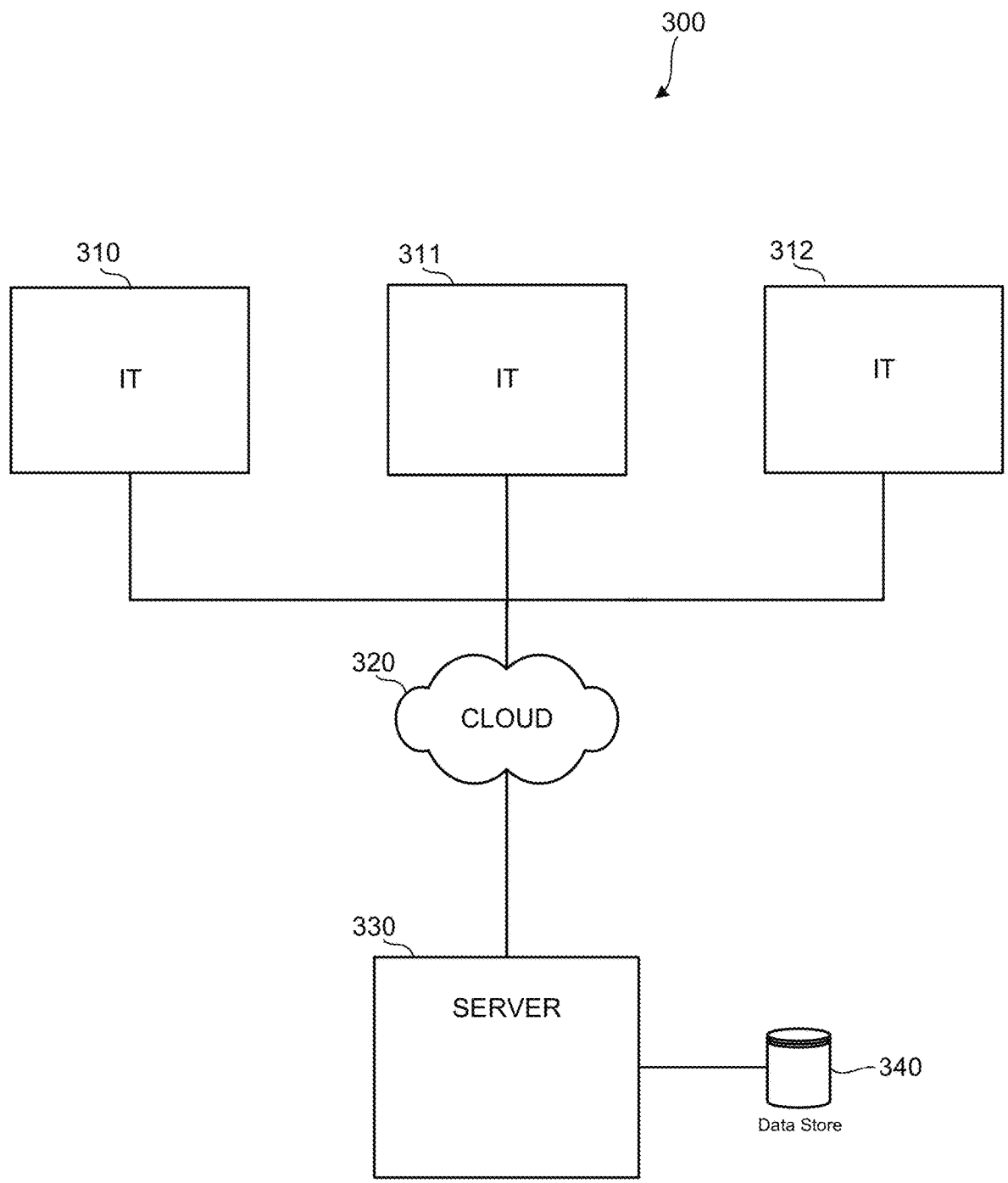
FIG. 3 illustrates an example industrial internet configuration.

FIG. 3 illustrates an example industrial internet configuration 300. Example configuration 300 includes a plurality of health-focused systems 310-312, such as a plurality of health information systems 100 (e.g., PACS, RIS, EMR, etc.) communicating via industrial internet infrastructure 300. Example industrial internet 300 includes a plurality of health-related information systems 310-312 communicating via a cloud 320 with a server 330 and associated data store 340.

As shown in the example of FIG. 3, a plurality of devices (e.g., information systems, imaging modalities, etc.) 310-312 can access a cloud 320, which connects the devices 310-312 with a server 330 and associated data store 340. Information systems, for example, include communication interfaces to exchange information with server 330 and data store 340 via the cloud 320. Other devices, such as medical imaging scanners, patient monitors, etc., can be outfitted with sensors and communication interfaces to enable them to communicate with each other and with the server 330 via the cloud 320.

Thus, machines 310-312 within system 300 become "intelligent" as a network with advanced sensors, controls, analytical based decision support and hosting software applications. Using such an infrastructure, advanced analytics can be provided to associated data. The analytics combines physics-based analytics, predictive algorithms, automation, and deep domain expertise. Via cloud 320, devices 310-312 and associated people can be connected to support more intelligent design, operations, maintenance, and higher server quality and safety, for example.

Using the industrial internet infrastructure, for example, a proprietary machine data stream can be extracted from a device 310. Machine-based algorithms and data analysis are applied to the extracted data. Data visualization can be remote, centralized, etc. Data is then shared with authorized users, and any gathered and/or gleaned intelligence is fed back into the machines 310-312.

While progress with industrial equipment automation has been made over the last several decades, and assets have become 'smarter,' the intelligence of any individual asset pales in comparison to intelligence that can be gained when multiple smart devices are connected together. Aggregating data collected from or about multiple assets can enable users to improve business processes, for example by improving effectiveness of asset maintenance or improving operational performance if appropriate industrial-specific data collection and modeling technology is developed and applied.

In an example, an industrial asset can be outfitted with one or more sensors configured to monitor respective ones of an asset's operations or conditions. Data from the one or more sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, or to enhanced software algorithms for operating the same or similar asset at its edge, that is, at the extremes of its expected or available operating conditions.

Systems and methods to manage industrial assets can include or can be a portion of an Industrial Internet of Things (IIoT). In an example, an IIoT connects industrial assets, such as turbines, jet engines, and locomotives, to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of industrial assets with the remote computing resources to enable the IIoT often presents technical challenges separate and distinct from the specific industry and from computer networks, generally. A given industrial asset may need to be configured with novel interfaces and communication protocols to send and receive data to and from distributed computing resources. Given industrial assets may have strict requirements for cost, weight, security, performance, signal interference, and the like such that enabling such an interface is rarely as simple as combining the industrial asset with a general purpose computing device.

To address these problems and other problems resulting from the intersection of certain industrial fields and the IIoT, embodiments may enable improved interfaces, techniques, protocols, and algorithms for facilitating communication with and configuration of industrial assets via remote computing platforms and frameworks. Improvements in this regard may relate to both improvements that address particular challenges related to particular industrial assets (e.g., improved imaging systems, medical records systems, analytics systems, etc.) that address particular problems related to use of these industrial assets with these remote computing platforms and frameworks, and also improvements that address challenges related to operation of the platform itself to provide improved mechanisms for configuration, analytics, and remote management of industrial assets.

The Predix™ platform available from GE is a novel embodiment of such Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial assets can be uniquely situated to leverage its understanding of industrial assets themselves, models of such assets, and industrial operations or applications of such assets, to create new value for industrial customers through asset insights.

D. Data Mining Examples

Imaging informatics includes determining how to tag and index a large amount of data acquired in diagnostic imaging in a logical, structured, and machine-readable format. By structuring data logically, information can be discovered and utilized by algorithms that represent clinical pathways and decision support systems. Data mining can be used to help ensure patient safety, reduce disparity in treatment, provide clinical decision support, etc. Mining both structured and unstructured data from radiology reports, as well as actual image pixel data, can be used to tag and index both imaging reports and the associated images themselves.

E. Example Methods of Use

Clinical workflows are typically defined to include one or more steps or actions to be taken in response to one or more events and/or according to a schedule. Events may include receiving a healthcare message associated with one or more aspects of a clinical record, opening a record(s) for new patient(s), receiving a transferred patient, reviewing and reporting on an image, executing orders for specific care, signing off on orders for a discharge, and/or any other instance and/or situation that requires or dictates responsive action or processing. The actions or steps of a clinical workflow may include placing an order for one or more clinical tests, scheduling a procedure, requesting certain information to supplement a received healthcare record, retrieving additional information associated with a patient, providing instructions to a patient and/or a healthcare practitioner associated with the treatment of the patient, radiology image reading, dispatching room cleaning and/or patient transport, and/or any other action useful in processing healthcare information or causing critical path care activities to progress. The defined clinical workflows may include manual actions or steps to be taken by, for example, an administrator or practitioner, electronic actions or steps to be taken by a system or device, and/or a combination of manual and electronic action(s) or step(s). While one entity of a healthcare enterprise may define a clinical workflow for a certain event in a first manner, a second entity of the healthcare enterprise may define a clinical workflow of that event in a second, different manner. In other words, different healthcare entities may treat or respond to the same event or circumstance in different fashions. Differences in workflow approaches may arise from varying preferences, capabilities, requirements or obligations, standards, protocols, etc. among the different healthcare entities.

In certain examples, a medical exam conducted on a patient can involve review by a healthcare practitioner, such as a radiologist, to obtain, for example, diagnostic information from the exam. In a hospital setting, medical exams can be ordered for a plurality of patients, all of which require review by an examining practitioner. Each exam has associated attributes, such as a modality, a part of the human body under exam, and/or an exam priority level related to a patient criticality level. Hospital administrators, in managing distribution of exams for review by practitioners, can consider the exam attributes as well as staff availability, staff credentials, and/or institutional factors such as service level agreements and/or overhead costs.

Additional workflows can be facilitated such as bill processing, revenue cycle mgmt., population health management, patient identity, consent management, etc.

III. Example Healthcare Cloud Factory Systems and Methods

Figure 4A:
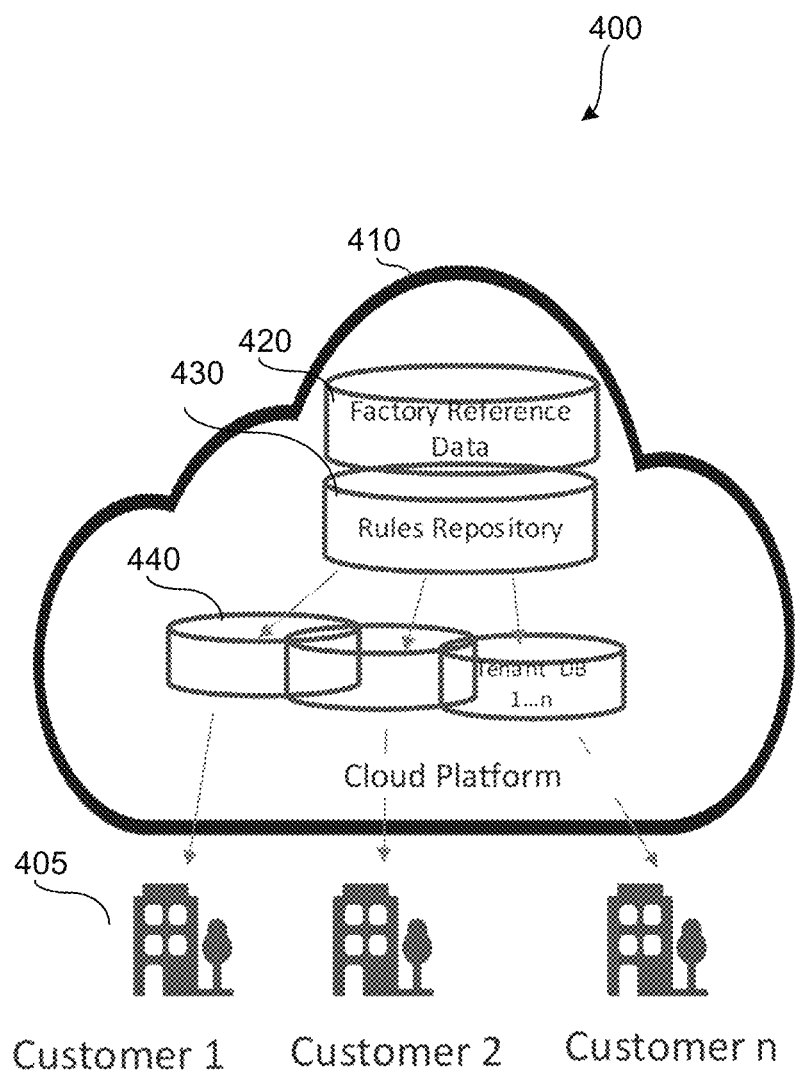
FIG. 4A illustrates an example cloud platform providing factory set(s) to customer.

Certain examples provide a technologically improved healthcare cloud factory apparatus to provide organization, storage, query, and provisioning of order forms, templates, etc., to customer. As shown in the example of FIG. 4A, a cloud platform 410 provides access to a plurality of customers 1 . . . n 405. Within the cloud platform 410, factory reference data 420 is combined with a rules repository 430 to generate a plurality of tenant databases 440. Each customer 405 has access to at least one tenant database 440. In some examples, each customer 405 has its own corresponding tenant database 440. In other examples, a customer 405 may have access to a particular tenant database 440 as well as a group and/or organizational database 440.

The customer 405 can access the tenant database 440 and associated rules 430, functionality, etc., to generate orders, etc., at the customer site 405. In certain examples, the customer 405 can map codes to a factory set of codes (e.g., stored in the tenant database 440 and/or factory reference data 410, etc.) such that a factory set of generic orderable items is mapped to vendor-specific codes, and the catalog content evolves by customer 405, group of customers 405, category/type of customer 405, organization of customers 405, etc.

Figure 4B:
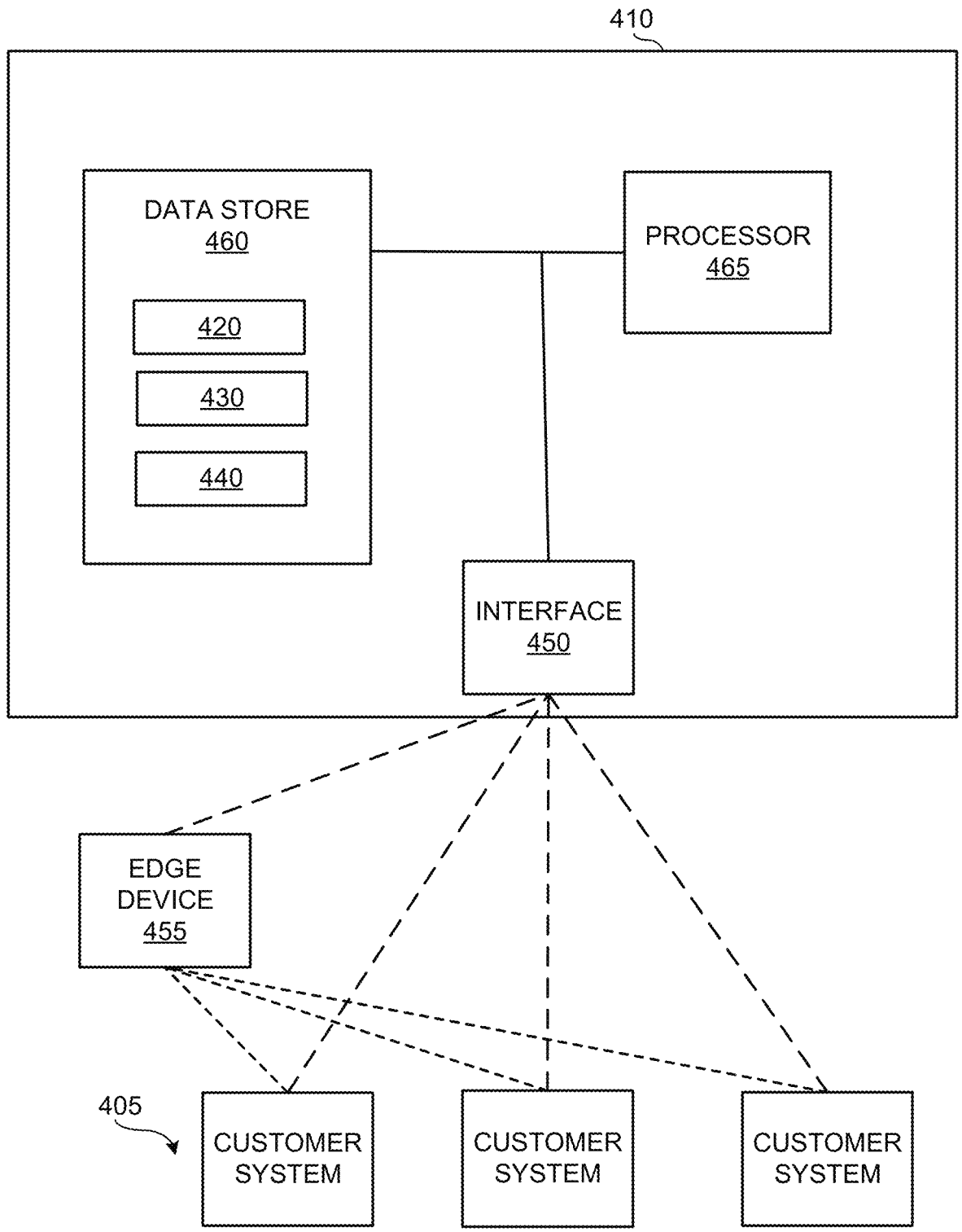
FIG. 4B illustrates an example catalog infrastructure implementation of the cloud factory platform of FIG. 4A.

FIG. 4B illustrates an example catalog infrastructure implementation of the cloud factory platform 410. The example infrastructure communicates with a customer system 405 to import and/or export content between the customer system 405 and the cloud factory 410. As shown in the example of FIG. 4B, the cloud factory platform infrastructure 410 includes an interface 450 to receive and/or transmit a code set and/or other content to and/or from an external system (e.g., a PACS, RIS, EMR, etc.). The example interface 450 can engage a customer and/or third-party system 405 to exchange content.

In certain examples, an edge device 455 facilitates communication between external systems/devices 405 and the cloud factory platform infrastructure 410. The edge device 455 can communicate with a protocol employed by the local system(s) 405 to function as a gateway or mediator between the local system(s) 405 and the cloud factory platform 410. In some examples, the edge device 455 can translate between protocols (e.g., a protocol used by the cloud platform 410 and a protocol used by the customer device 405, etc.), automatically format content for the cloud platform 410 and/or customer system 405, generate catalog entry(-ies) from customer 405 information to be stored by the cloud platform 410, deploy catalog content (e.g., a catalog content set, etc.) in a format usable by the customer system 405 (e.g., executable program code or instructions for an interface, form, application, record, etc.), etc.

In other examples, the interface 450 of the cloud platform infrastructure 410 can directly translate between protocols (e.g., a protocol used by the cloud platform 410 and a protocol used by the customer device 405, etc.), automatically format content for the cloud platform 410 and/or customer system 405, generate catalog entry(-ies) from customer 405 information to be stored by the cloud platform 410, deploy catalog content (e.g., a catalog content set, etc.) in a format usable by the customer system 405 (e.g., executable program code or instructions for an interface, form, application, record, etc.), etc., without the edge device 455.

In certain examples, the example infrastructure 410 is implemented on a public cloud. In certain examples, the example infrastructure 410 is implemented on a private cloud. In certain examples, the example infrastructure 410 is a hybrid with a first portion implemented in a cloud and a second portion implemented in connection with a local clinical information system, etc. In certain examples, the edge device 455 and/or interface 450 are accessible via a public network (e.g., the Word Wide Web, etc.). In certain examples, the edge device 455 and/or interface 450 are accessible via a private network (e.g., a virtual private network, a dedicated or protected network, etc.).

As shown in the example of FIG. 4B, a data store 460 stores the factory reference data 420 (e.g., standard codes, etc.), rules repository 430 (e.g., code mappings, etc.), tenant databases 440 (e.g., customer codes, etc.), etc. The data store 460 can be implemented as one or more data storage drives, disks, memory structures, etc., to arrange the reference data, rules, tenant content, etc., for access (e.g., storage and/or retrieval), correlation, processing, mapping, extrapolating, etc. Together, the content of the data store 460 (e.g., one or more catalog content sets, etc.) forms a factory catalog for the one or more customer systems 405.

The example implementation of the factory platform infrastructure 410 of FIG. 4B also includes a processor 465 to manipulate the data store 460 and its content, drive the interface 450, process incoming and/or outgoing data, etc. In operation, the processor 465 drives the infrastructure 410 to receive a request for content from the customer system 405, retrieve requested content from the data store 460, organize the requested content, and deliver the content to the customer device 405 (e.g., directly via the interface 450 and/or indirectly via the edge device 455, etc.). The processor 465 can also drive the infrastructure 410 to receive content, such as a code set, from a customer system 405 (e.g., via the interface 450 alone or in conjunction with the edge device 455, etc.) and store the content in the data store 460 (e.g., in the corresponding tenant database 440). Thus, the customer device 405 can dock with the catalog factory platform 410, directly via the interface 450, via the cloud, via the cloud using the edge device 455, etc. A connection is established between the catalog factory platform 410 and the customer device 405 for exchange of content.

In certain examples, content (e.g., codes, etc.) received by the platform 410 from a customer system 405 can be mapped to a standard (e.g., a standard or shared set of codes, terminology, syntax, etc.). The content, in its original and/or standardized form, can then be added to the tenant database 440 and/or other part of the data store 460 to form part of the catalog (e.g., a catalog content set for the particular tenant/customer, generally available to customer affiliates, everyone, etc.). The standardized content can be deployed to the customer 405 when configuration and/or other condition is appropriate for the content at the customer system 405, for example. In certain examples, a mapping/standardization can be updated by the processor 465 based on a new code set/terminology, update and/or other change, etc. The new and/or updated/revised mapping can be provided to the customer system 405 based on the platform 410—customer device 405 connection, a subscription service to which the customer 405 subscribes facilitated by the processor 465, etc.

In certain examples, the factory 410 forms a catalog of items (e.g., catalog content sets, etc.) that can originate from disparate sources. The data store 460 allows the factory 410 to serve as a single source or repository for these items, organized and made available to devices/systems. In certain examples, a customer system 405 can subscribe to certain content to receive the content from the factor 410 and receive updates to that content as they become available according to the provisions of the subscription. In certain examples, the factory platform 410 provides a factory content set that can be shared across providers of services and made available to users of services, who can each have their own instance in the factory 410 with their particular preferences, configuration, subscription information, etc. The factory 410 provides a data model that allows the processor 465 to aggregate content from disparate sources and provide the content to the customer 405. The customer 405 can maintain their own content and gain standardization through standardized mapping of their content to standard/reference/other content, for example.

In certain examples, mapping is calculated automatically by the processor 465 in the factory 410 to be transparent to the customer system 405, which then has the standardized mapping as well as its original content set. Such subscription-based mapping can facilitate automated, dynamic addition/expansion/etc. as new content systems/formats/protocols/etc. become available after the customer 405 subscription is activated, for example. The processor 465 provides automated curation of content in the factory 410 then dispensed to customer device(s) 405. In certain examples, when the customer device 405 docks with the catalog factory 410, rules, content, configuration, etc., can be detected by the processor 465 and/or edge device 455 to configure and/or update the customer device's 405 settings/subscription with the catalog factory 410. Thus, the processor 465 and/or edge device 455 can look at patterns in customer and/or aggregated content to curate the content, standardize the content, confirm the content as "truthed" content, etc. Content is organized and formatted as a catalog to which the customer system 405 can subscribe to receive the catalog of content and benefit from its ongoing maintenance. The customer system 405 can then rely on the stability, accuracy, and currency of the content without having to determine these on its own, for example.

FIG. 5A illustrates an example generic list of orderable items 500 as it can be stored and accessible via the cloud platform 410. The example 500 shows an identifier, a name, an associated code and description, as well as version information, purpose, provide, type, and/or various requirement(s), for example. Various requirement(s) can be associated with the orderable item 500 and its data model. The example model 500 ties together a name, a reference, a code, system/version information, provider, purpose, source, type, requirement(s), etc., into an easy-to-use, flexible item or model 500. The orderable items 500 can be processed automatically by a customer machine 405 after being retrieved from the cloud factory 410. Using the model or list 500, stored in the data store 460, allows the processor 465 of the catalog factory 410

FIG. 5B illustrates an example of vendor orderable items 550 as it can be stored and accessible via the cloud platform 410. The example 550 shows an identifier, name, code, code description, version information, provider, source, type, and/or various requirement(s), for example. As shown in the example of FIG. 5B, multiple item variants (e.g., multiple basic metabolic panel variants) can be organized, mapped, and/or otherwise maintained via the orderable item model 550. The vendor orderable item 550 can be processed automatically by a customer machine 405 after being retrieved from the cloud factory 410.

Figure 6:
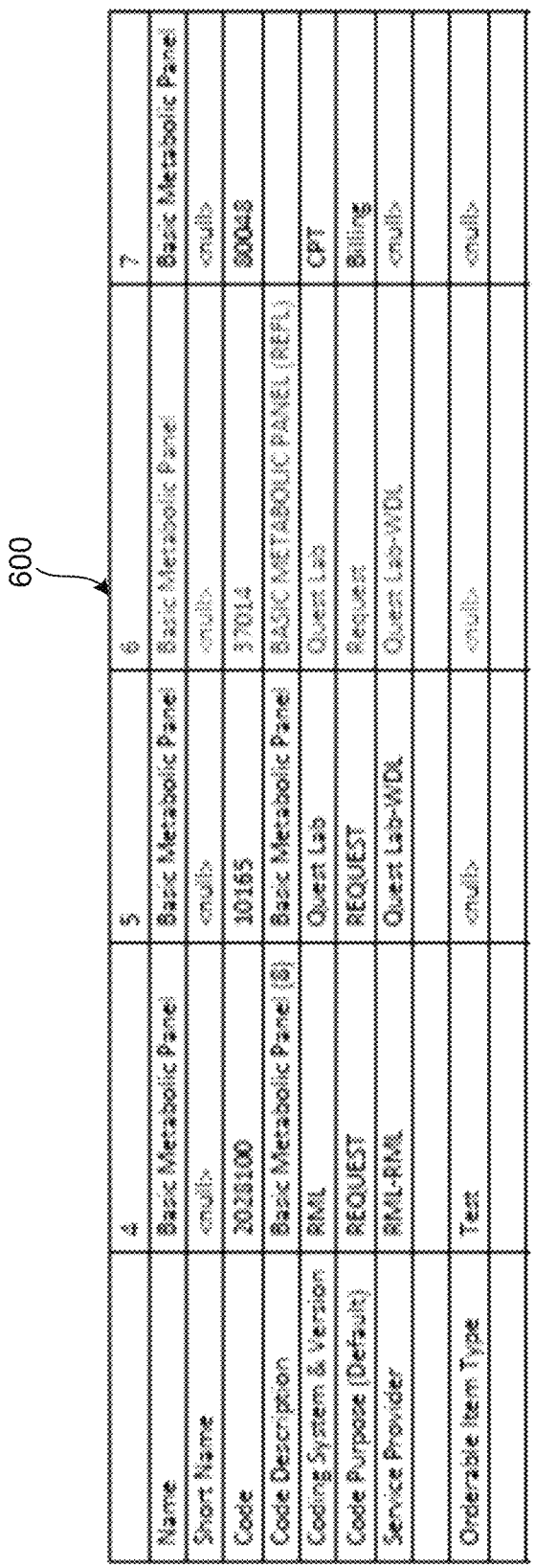

FIG. 6 shows an example of a plurality of items combined into a group or table 600 to be stored and retrieved from the cloud platform 410. Thus, a collection of orders (e.g., a plurality of basic metabolic panels, etc.) can be saved together and retrieved in conjunction for use by the customer 405. As shown in the example of FIG. 6, multiple item variants (e.g., multiple basic metabolic panel variants) can be organized, mapped, and/or otherwise maintained via the orderable item model 600.

Figure 7:
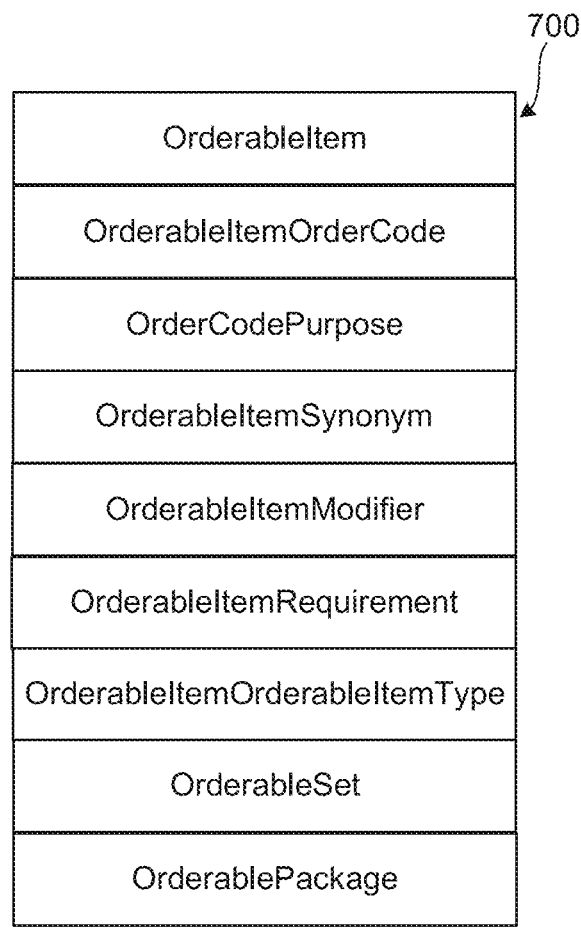
FIG. 7 illustrates an example data model to standardize an order catalog and mapping and maintain one or more code mappings for one or more vendors.

FIG. 7 illustrates an example data model 700 to standardize an order catalog and mapping and maintain one or more code mappings for one or more vendors. As disclosed and described above, the factory 410 can be used to standardize order catalog contents. In certain examples, a "starter set" of catalog items can be provided with a mapping to customer/vendor/tenant codes. Then, codes from partners, vendors, customers, other tenants, standards organizations, etc., can be mapping to the existing content base in the factory catalog. A data model, such as the data model of FIG. 7, supports persistence of generic order catalog content along with multiple codes. To support this, the example data model 700 includes the following: OrderableItem, OrderableItemOrderCode, OrderCodePurpose, OrderableItemSynonym, OrderableItemModifier, OrderableItemRequirement, OrderableItemOrderableItemType, OrderableSet, and OrderablePackage.

The OrderableItem is a list of unique orderable items maintained in the data store 460 of the catalog factory 410 and ordered through a user interface (e.g., included in the interface 450) associated with the catalog factory 410, edge device 455, customer system 405, etc. This is the list of orders from which a user can order. An orderable item is represented by a common name for display, for example. An orderable item can have zero, one, or many order codes, for example. An orderable item can be a standalone item or it can belong to one or more than one orderable set, for example.

The OrderableItemOrderCode is an order code for an orderable item. An orderable item can have more than one order code per purpose. An order code for the orderable item can be pre-associated with modifier(s) for pricing or statistical/informational documentation, for example. An order code can also be associated with a performing provider to be used for the specified purpose, for example.

The OrderCodePurpose is a list of supported purposes for an order code when associating to an orderable item. For example, Clinical Decision Support (CDS), Request, Billing, Quality Reporting, etc., can be an OrderCodePurpose.

The OrderableItemSynonym is a list of synonym names for an orderable item. For example, if the orderable item is HBA1C, then synonyms are HBA1C, Hemoglobin A1C, Basic Metabolic Panel, Basic Metabolic Panel, Metabolic Panels, BMP, A1C, Glycated Hemoglobin, HgbA1c.

The OrderableItemModifier is an association of a list of modifiers applicable to an orderable item.

The OrderableItemRequirement specifies additional requirement(s) for an orderable item such as specimen requirements including collection, storage, and transportation instructions, test grouping requirements, etc. The requirement is provider specific, for example.

The OrderableItemOrderableItemType stores an association of orderable item to orderable item type—types such as Laboratory, Imaging, etc.

The OrderableSet is a definition of a logical grouping of orderable items. An orderable set is used to streamline order workflow process, for example. A set can be used to group frequently used orderable items so that the user has a quick access to the list of orderable items, for example. A set can also be used to group a logical panel of orderable items together so that the user can order all of the orderable items with one click by selecting at the set level, for example.

The OrderablePackage is an association of orderable set by package type—package type can be clinical specialty, medical condition/condition set, etc.

The data model entities 700 are aptly supported by Terminology, Provider Directory, Specialty, Modifier, and other entities as also associated seed data, for example. In an example, a factory model of an Order catalog allows factory catalog data to be provisioned (e.g., subscribed) to one or more tenant catalogs, in such a way that a tenant system 405 can seek benefit of factory set of items and sets and packages for ordering within the tenant 405. Similarly, the factory model applies to Provider Directory, Rule Catalog, and/or other clinical application, for example.

Thus, certain examples improve existing cloud platforms and customer order technology through factory sets of standard data and content available to each customer 405. The customer 405 can subscribe to ease the support of configuration and maintenance of the order management system. Factory sets can include service providers, orderable items, order sets, order lists, clinical decision support rules, etc. Customers 405 can subscribe to the factory 410, access the tenant database 440, and modify and/or create their own database 440 information, for example. In certain examples, customers 405 can register using a National Plan and Provider Enumeration System (NPPES).

Certain examples provide multiple levels of ordering. For example, an order list is a list of orderable items and order groups based on problem and specialty. An order group is a group of orderable Items that can be ordered at once. Orderable items are individual items that can be placed on a list or within a group (e.g., CBC, Chest X-Ray, etc.). Content providers can provide input into the factory reference data set 420, for example.

Figure 8A:
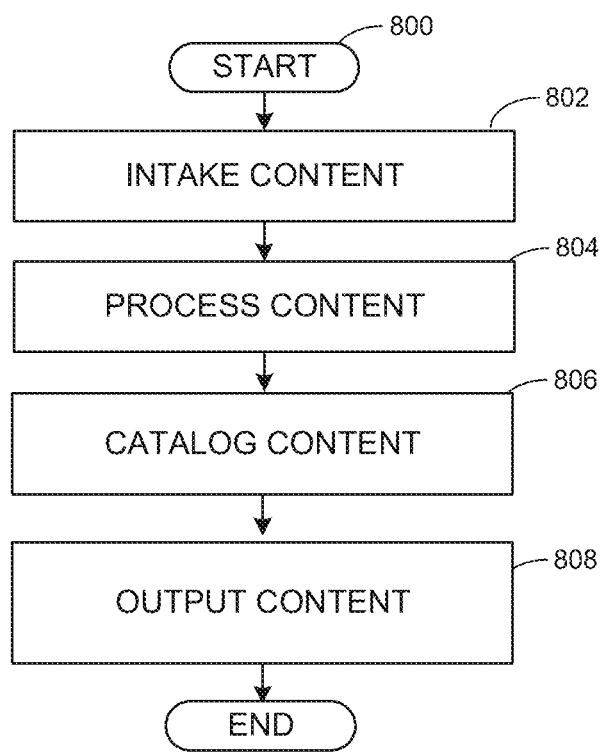
FIGS. 8A-8C illustrate flow diagrams of example methods to organize and provision content from the cloud factory to customers via the example cloud platform of FIG. 4A.

FIG. 8A illustrates a flow diagram of an example method 800 to generate and provide factory catalog content via the cloud factory platform 410. At block 802, intake of content occurs. For example, content can be intaken from a customer device 405, a standards-based and/or other reference data store, third party archive, etc. At block 804, the content is processed. For example, the content can be mapped to a reference format/structure/syntax/protocol, converted, normalized, compared, added, subtracted, aggregated, etc. At block 806, the content is cataloged. For example, the processed content is organized into a catalog content set and/or other catalog entry for ease of distribution such as through ordering, subscription, etc. At block 808, the cataloged content can be output. For example, the catalog content set can be transmitted upon request, output to subscribers, made available for retrieval and/or reference, deployed in a cloud-based and/or other application service provider or platform/software as a service model, etc.

Figure 8B:
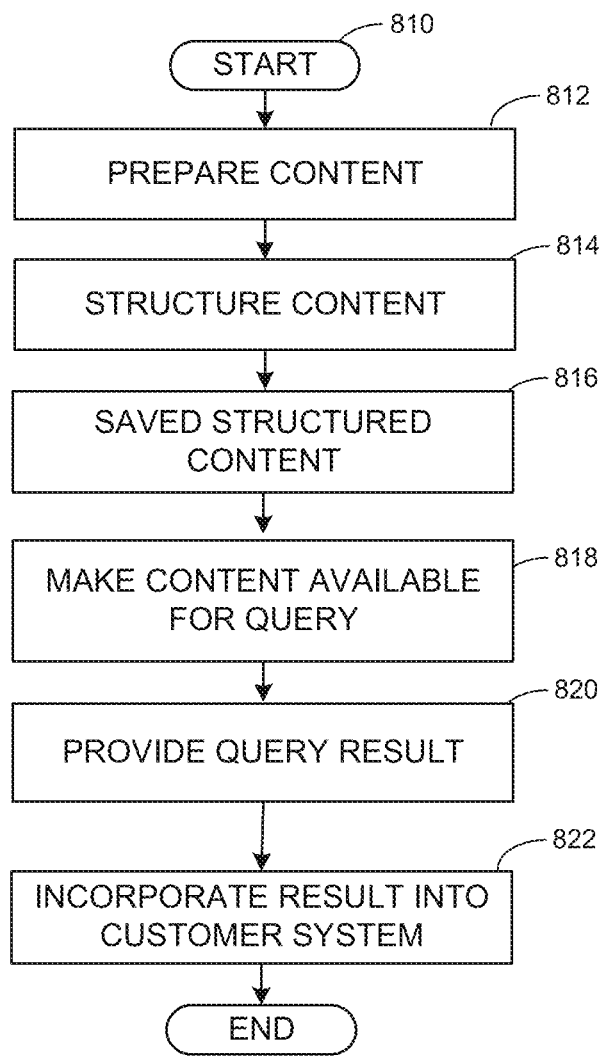

More specifically, FIG. 8B illustrates a flow diagram of an example method 810 to organize and provision content from the cloud factory 410 to customers 405. At block 812, content is prepared in the reference data 420, rules repository 430, and/or tenant database(s) 440 of the cloud platform 410. Content provider(s) can also provide content in the reference data 420, for example.

At block 814, content is structured to match one or more templates. For example, content provided by a third party content provider is structured to match an accepted and/or other predetermined template.

At block 816, the structured content is saved for customer 405 access. In certain examples, content can be formatted in a spreadsheet according to a spreadsheet template and converted into a text file for import into the data set 420. Errors can be checked and reconciled to help ensure proper upload and save in the cloud 410.

At block 818, the content is made available for query by a customer 405. For example, an ordering provider can search and select a generic order item using a LOINC code as a generic Order Item Code.

At block 820, a result is provided. For example, an order list, order set, etc., is provided for use by the customer 405.

At block 822, the result can be incorporated into the customer's system 405 and used by the customer for its practitioners, patients, etc.

Figure 8C:
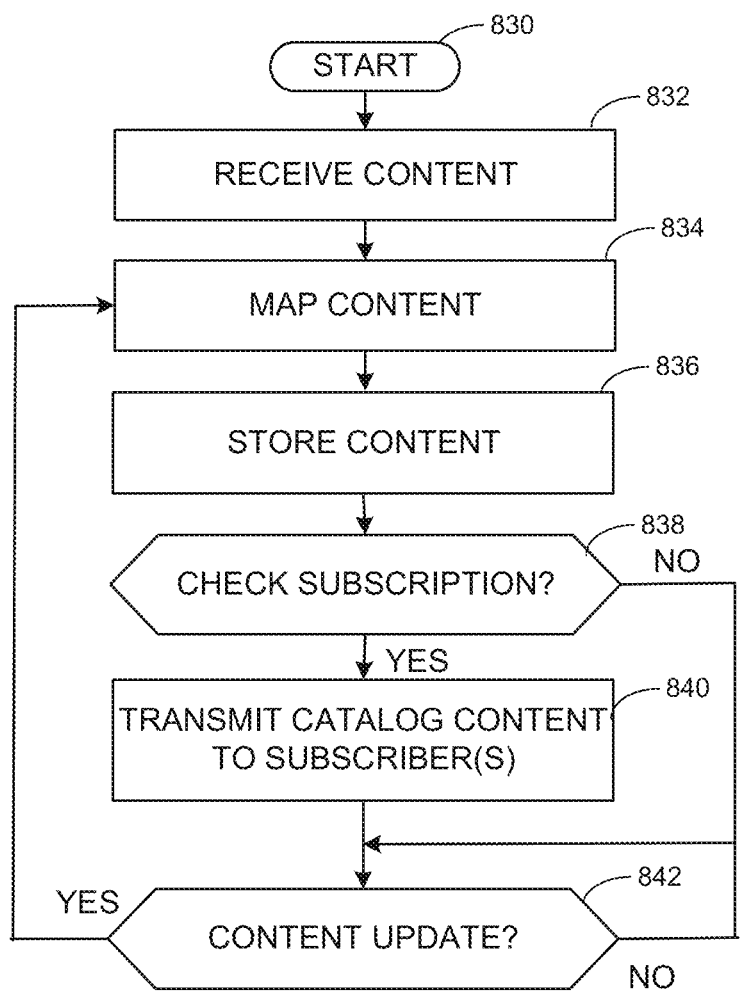

FIG. 8C illustrates a flow diagram of another example method 830 to build a content catalog using a catalog factory platform infrastructure 410 and leverage customer system 405 and other content for standardization, reference, and analysis, for example. At block 832, the cloud factory platform 410 receives content (e.g., via push and/or pull using the interface 450 and/or the edge device 455, etc.) for inclusion in the factory catalog. For example, a customer system 405 provides a set of orders, a healthcare organization provides a standard set of orders, an association or governing body provides a reference set of orders, etc.

At block 834, the content is mapped to other content in the factory catalog. For example, customer 405 orders are mapped to reference orders, a first customer's orders are mapped to a second customer's orders, standard orders are mapped to reference orders, etc. At block 836, the mapped content is stored in the factory catalog. Thus, the mapped content becomes part of a tenant database 440, factory reference data 420, etc.

At block 838, the mapped content is evaluated with respect to catalog subscriptions. If a customer system 405 is subscribed to that catalog content, then, at block 840, the mapped content is transmitted to subscribing system(s) 405. Thus, for example, if a customer device 405 provides its content, the device 405 can subscribe to receive back the content mapped to a standard or reference set of content in the factory catalog, for example.

At block 842, the catalog content is evaluated and/or otherwise monitored for an update. For example, a new set of customer content, a new reference or standard set of content, an addition of "truthed" content, etc., can be detected. If an update to the relevant content has occurred, then control reverts to block 834 to map the content and update the catalog. If no update has occurred, the processor 465 waits for an update to modify that content in the catalog, for example.

When a customer 405 is setting up their systems to support these activities (e.g., creating order sets, orderable items, etc.), configuration can be done using the cloud factory 410 but particular to that customer 405 and associated database 440, for example. For example, creating an order description for a hemoglobin A1C may have proprietary code, etc. While managing all the proprietary codes becomes cumbersome for one customer, let alone multiple customers, the cloud factory 410 facilitates centralized, standardized, and automated management and provisioning of standard and custom items for a plurality of customer systems 405. Orders can include lab orders, imaging orders, procedure orders with CPT codes, evaluation and management (E&M) codes, many different coding systems both standard and proprietary, etc.

Certain examples reduce or eliminate managing and maintaining proprietary lists by providing a factory set with a standards-based solution as much as possible through a cloud-based catalog 410 for customers to utilize. Rather than independent, on-premise solutions, the factory catalog is a managed and maintained catalog of items that individual customers 405 subscribe to and download from for their installation which can also be in the cloud 410. Items can be imported from the cloud catalog into their cloud environment. Customers can manage and maintain in the cloud 410 and get updates in their environment. Local and/or national providers (e.g., doctors, labs, imaging centers, etc.) can be accessible to customers 405 such that information can be automatically retrieved from the cloud catalog rather than entered manually.

In certain examples, the cloud factory 410 can monitor and/or mine ordering behavior to have a set of common orders predefined and preselected for a particular user 405.

In certain examples, orderable items can be linked to standards-based conditions. Thus, if a provider is caring for a patient with a specific condition, items relevant to that condition can be surfaced to improve their ordering and configuration process. Data can be made accessible via contract, standard, etc., brought together in a single repository for access, packaging, and deployment, for example.

In certain examples, once a user 405 has checked out an item, the user 405 can modify an item but that item retains its relationship to the factory 410. Thus, a user can modify a retrieved item for its usage, but, when change(s) is/are made to a common terminology set, the user can be notified of the change(s) and assisted in maintaining the item according to terminology standard, for example.

In certain examples, a customer 405 can upload custom order(s) back to the factory 410, and those can be made available to that customer 405 and/or other customers 405 going forward.

Thus, certain examples are scalable for individual offices and larger organizations. Certain examples can tie into electronic medical records (EMR), practice solution systems, business solutions systems, practice management systems, financial risk management systems, etc.

Figure 9:
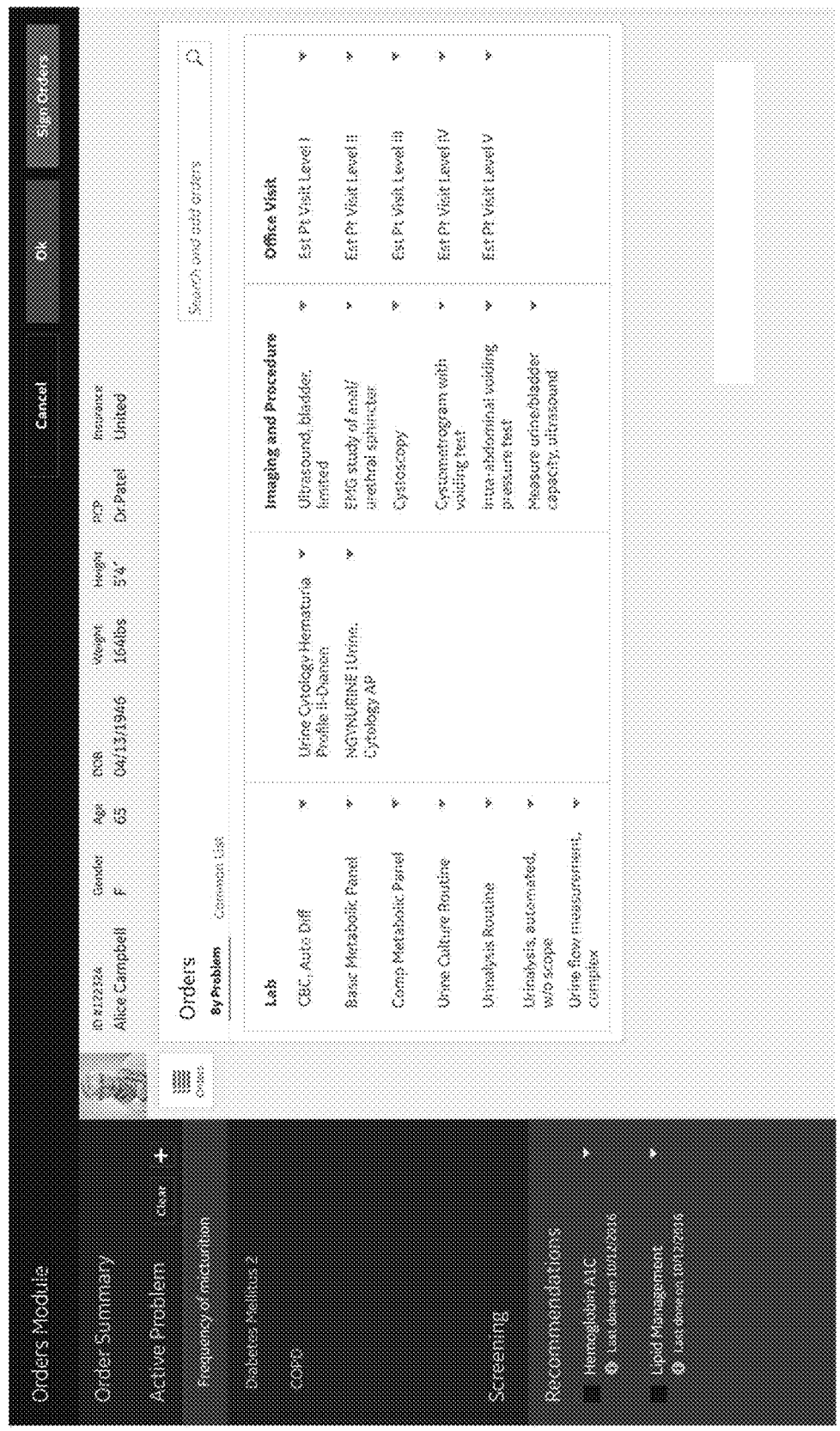
Figure 10:
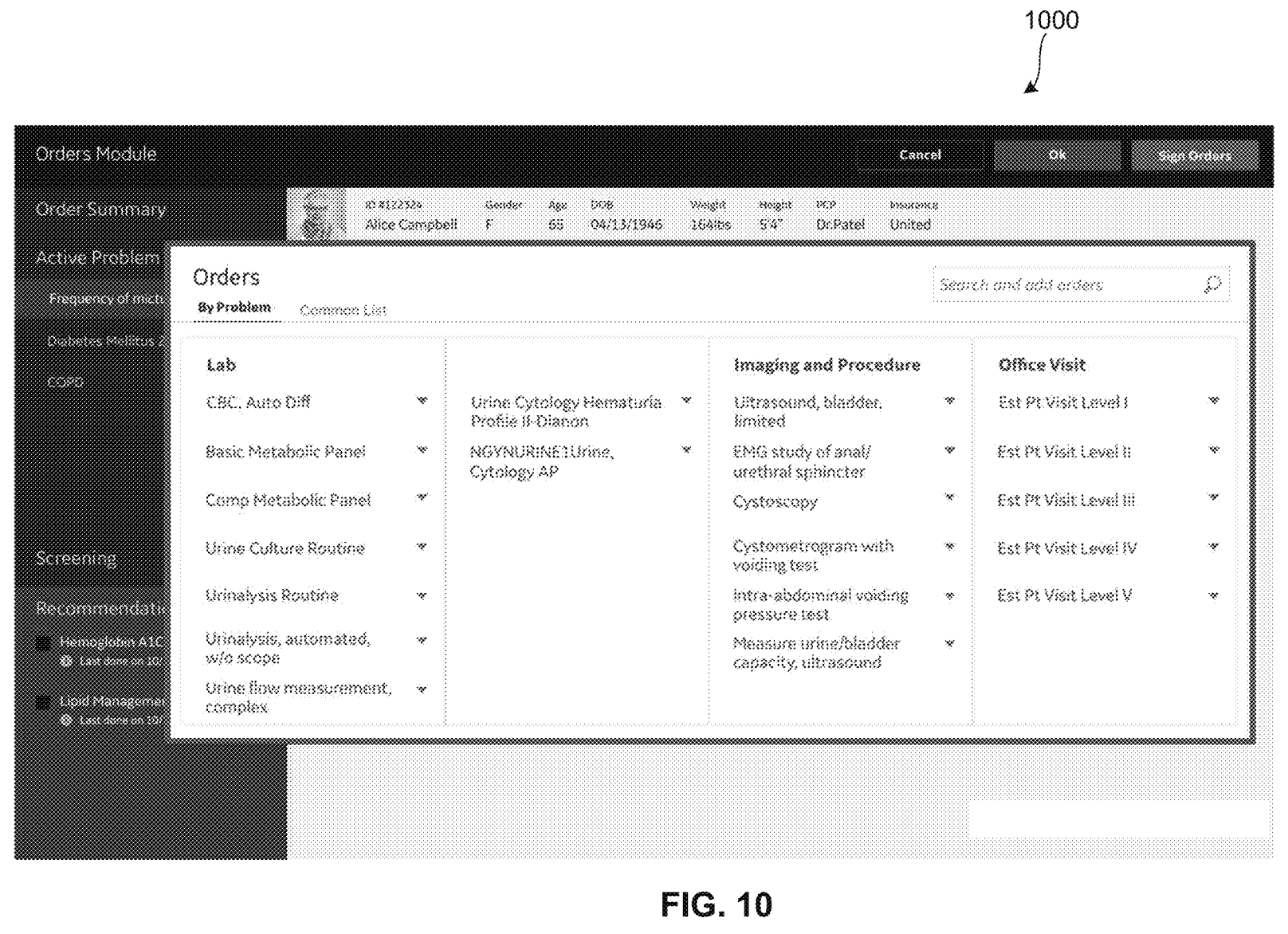
Figure 11:
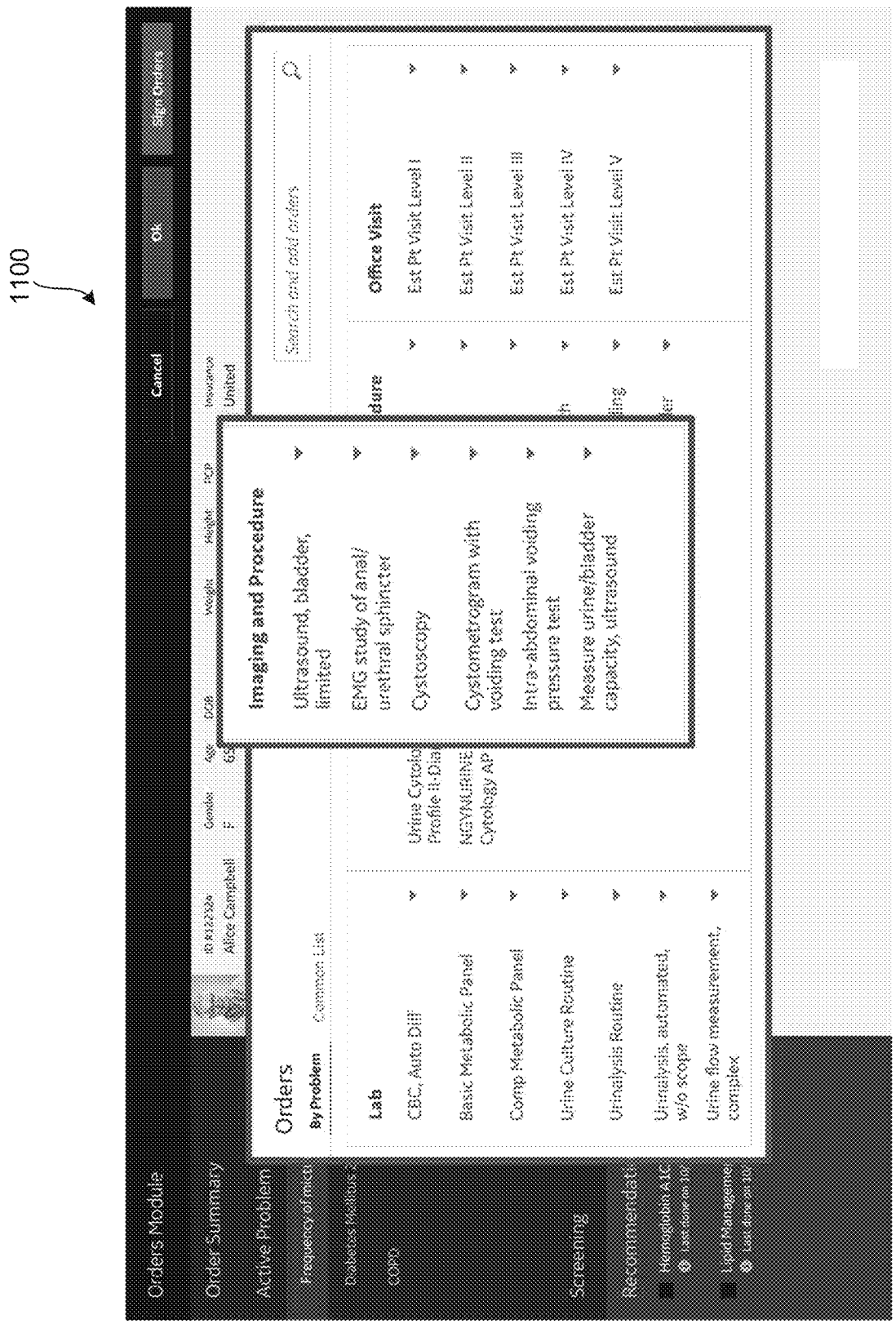
Figure 12:
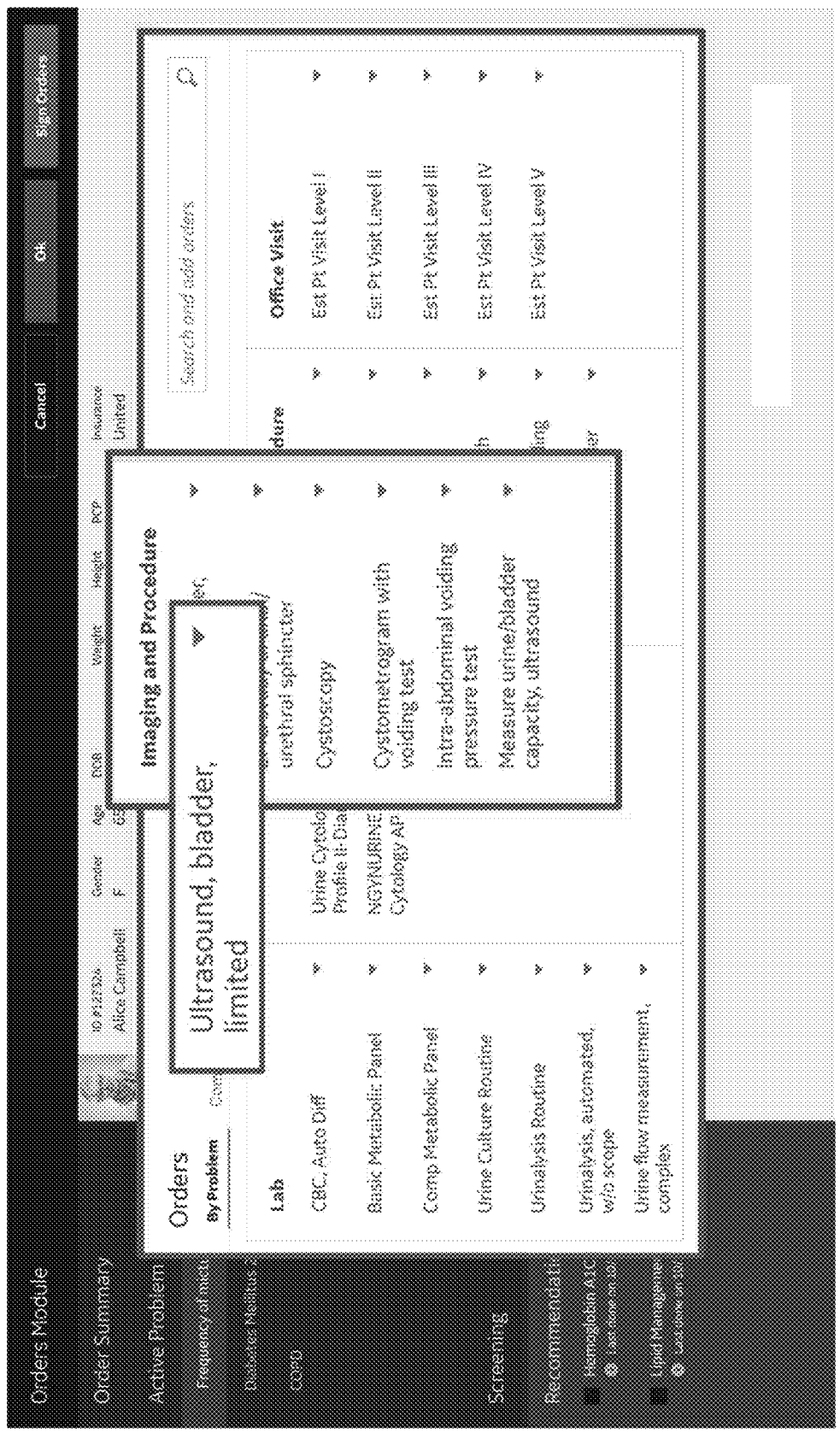
Figure 13:
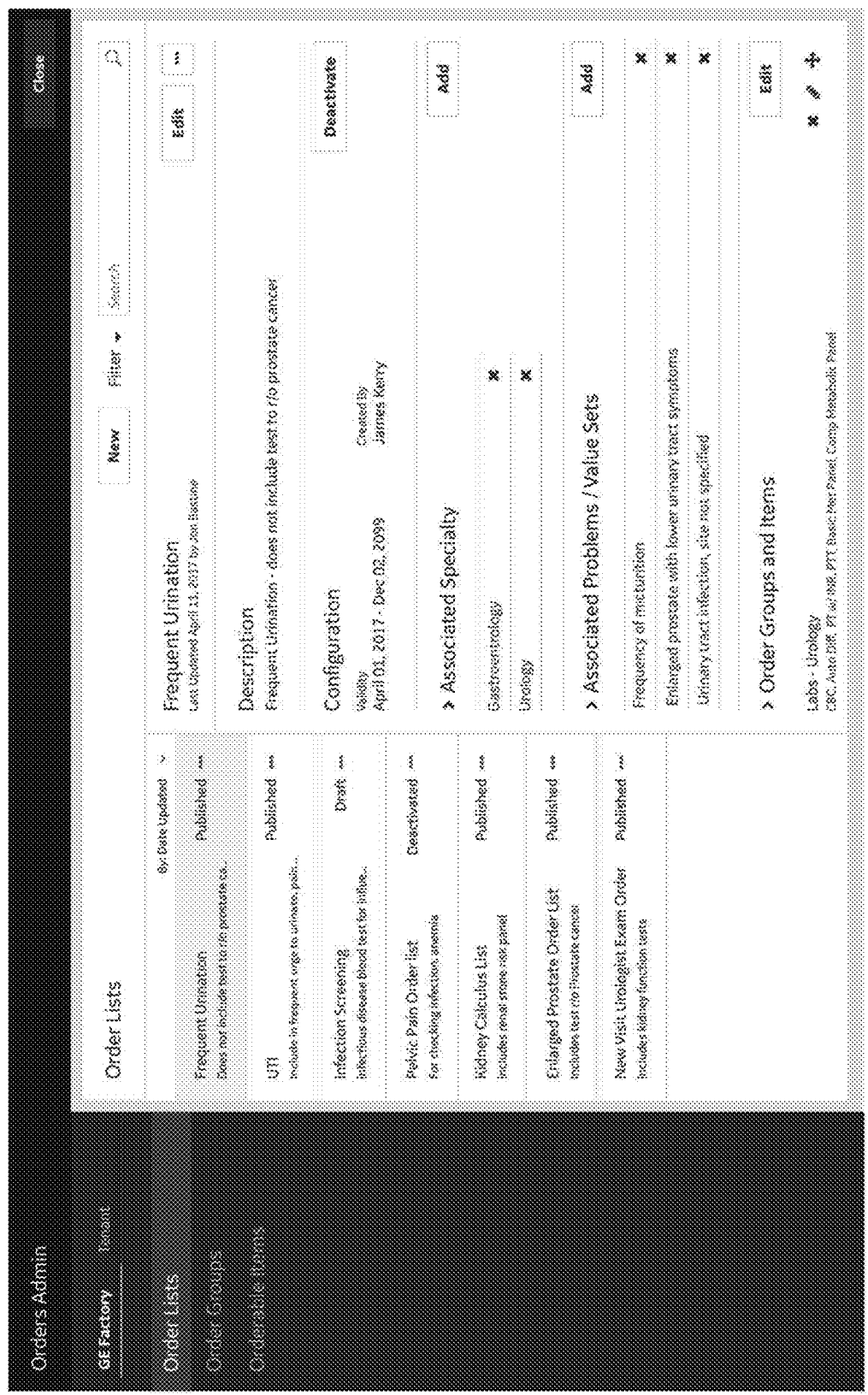
Figure 14:
Figure 15:

FIGS. 9-15 illustrate example interfaces for access to content in the cloud factory 410. FIG. 9 illustrates an example order module 900. FIGS. 10-11 illustrate example order lists 1000, 1100. FIG. 12 shows an example orderable item 1200. FIGS. 13-15 illustrate example order administration interfaces 1300, 1400, 1500.

Thus, certain examples provide laboratory orders including Microbiology, Hematology, Biochemistry, Clinical Pathology, etc. Certain examples provide imaging orders including X-Ray, CT, MRI, PET, NM, Mammography, Ultrasound, 2D Echo, Doppler, etc. Certain examples provide cardiology orders including EKG, Doppler, Ejection Fraction, Stress Test, etc. Certain examples provide procedure orders including Respiratory, PT, OT, Education, Nutrition, Care Management, etc. Certain examples provide immunization orders including immunization services, etc. Certain examples provide service orders including office visits with E&M codes, professional services, etc. Certain examples provide referral orders such as referrals to specialists, other physicians, etc. Certain examples provide codes for billing, orders, rules, reports, etc.

FIG. 16 illustrates an example file 1600 including tabs for imported content. Such content can be loaded into the cloud factory repository 420 from an external file, for example. Factory items can be organized by factory identification number, code, start date, expiration date, etc. Items can be checked to make sure identification number, start date, expiry date, etc., match a reference or recorded data. Items not satisfying that evaluation may not be allowed to be downloaded, uploaded, and/or modified, for example. In certain examples, an import tool can facilitate upload of content to the cloud 410.

In certain examples, data from an external file is converted into a table and validated for incorporation into the reference data set 420 and/or rules repository 430. FIG. 17 illustrates an example validation table. FIG. 18 illustrates some example default data for table values.

In certain examples, staging tables are created for the validation and conversion of information and incorporation into the repository 420. Values are checked (e.g., with foreign keys, checksum, value verification, etc.). Start and end dates can also be verified. Once data is incorporated into the reference set 420, the staging tables can be discarded, for example.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

Figure 19:
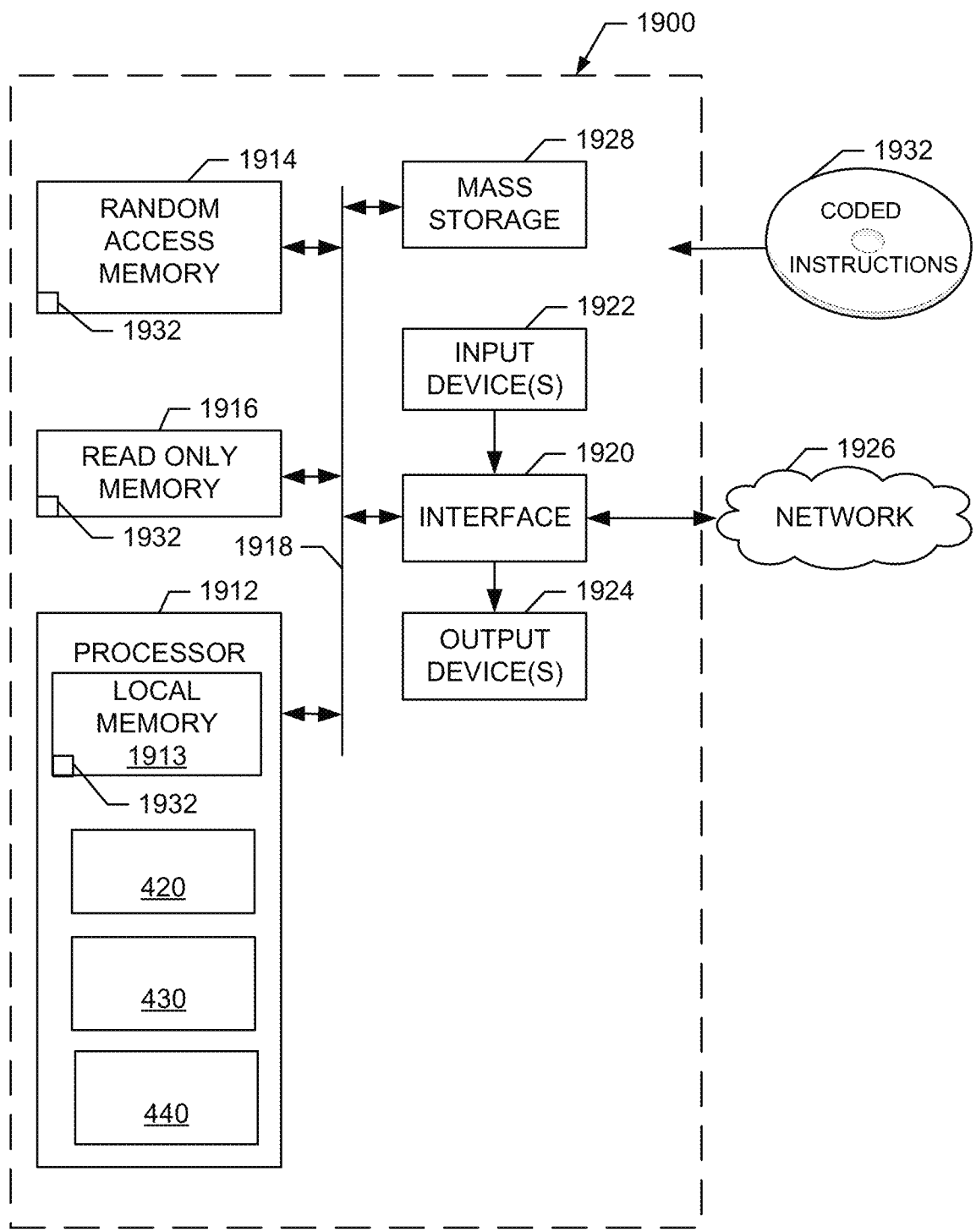
FIG. 19 is a block diagram of an example processor platform capable of executing instructions to implement the example systems and methods of FIGS. 1-18.

FIG. 19 is a block diagram of an example processor platform 1900 capable of executing instructions to implement the example systems and methods of FIGS. 1-19. The processor platform 1900 can be, for example, a server, a personal computer, a mobile device (e.g., a cell phone, a smart phone, a tablet such as an IPAD™), a personal digital assistant (PDA), an Internet appliance, or any other type of computing device.

The processor platform 1900 of the illustrated example includes a processor 1912. Processor 1912 of the illustrated example is hardware. For example, processor 1912 can be implemented by one or more integrated circuits, logic circuits, microprocessors or controllers from any desired family or manufacturer.

Processor 1912 of the illustrated example includes a local memory 1913 (e.g., a cache). Processor 1912 of the illustrated example is in communication with a main memory including a volatile memory 1914 and a non-volatile memory 1916 via a bus 1918. Volatile memory 1914 can be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 can be implemented by flash memory and/or any other desired type of memory device. Access to main memory 1914, 1916 is controlled by a memory controller. The processor 1912, alone or in conjunction with the memory 1913, can be used to implement some or all of the example systems and associated methods disclosed herein.

Processor platform 1900 of the illustrated example also includes an interface circuit 1920. Interface circuit 1920 can be implemented by any type of interface standard, such as an Ethernet interface, a universal serial bus (USB), and/or a PCI express interface.

In the illustrated example, one or more input devices 1922 are connected to the interface circuit 1920. Input device(s) 1922 permit(s) a user to enter data and commands into processor 1912. The input device(s) 1922 can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to interface circuit 1920 of the illustrated example. Output devices 1924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). Interface circuit 1920 of the illustrated example, thus, typically includes a graphics driver card, a graphics driver chip or a graphics driver processor.

Interface circuit 1920 of the illustrated example also includes a communication device such as a transmitter, a receiver, a transceiver, a modem and/or network interface card to facilitate exchange of data with external machines (e.g., computing devices of any kind) via a network 1926 (e.g., an Ethernet connection, a digital subscriber line (DSL), a telephone line, coaxial cable, a cellular telephone system, etc.).

Processor platform 1900 of the illustrated example also includes one or more mass storage devices 1928 for storing software and/or data. Examples of such mass storage devices 1928 include floppy disk drives, hard drive disks, compact disk drives, Blu-ray disk drives, RAID systems, and digital versatile disk (DVD) drives.

Coded instructions 1932 associated with any of FIGS. 1-18 can be stored in mass storage device 1928, in volatile memory 1914, in the non-volatile memory 1916, and/or on a removable tangible computer readable storage medium such as a CD or DVD. Coded instructions can be executed by the processor 1912 to transform and/or otherwise configure the processor 1912 as the catalog factory platform 410 including the factory reference data 420, rules repository 430, and tenant databases 440 as implemented by the data store 460 and processor 465 and communicating via the interface 1920, 450, rather than a generic processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A factory catalog system comprising:
a cloud computing device structured to communicate with at least one tenant system, the cloud computing device including:
a data store structured to store reference content, rules, and tenant content;
a processor structured to execute the rules stored by the data store effective to map incoming tenant content received from the at least one remote tenant to the reference content to form a catalog content set and to store the catalog content set in the data store to be output to at least one tenant system; and
an interface structured to receive the incoming tenant content from the at least one tenant system and provide the catalog content set to the at least one tenant system.

2. The system of claim 1, further including an edge device to facilitate input of the incoming tenant content and output of the catalog content set.

3. The system of claim 1, wherein the at least one tenant system is to establish a connection with the interface to exchange content.

4. The system of claim 3, wherein the connection is to be a private network connection.

5. The system of claim 1, wherein the catalog content set is to be organized according to an orderable item data model.

6. The system of claim 1, wherein the processor is to maintain a subscription to the catalog content set for the at least one tenant system.

7. The system of claim 1, wherein the processor is to, upon an update, map updated content with respect to the catalog content set.

8. A computer-readable storage medium comprising:
instructions which, when executed by at least one processor of a cloud computing device, are effective to:
map incoming tenant content to reference content using rules to form a catalog content set;
store the catalog content set in a data store of the cloud computing device; and
provide the catalog content set to at least one tenant system.

9. The storage medium of claim 8, wherein an edge device is to facilitate input of the incoming tenant content and output of the catalog content set.

10. The storage medium of claim 8, wherein the at least one tenant system is to establish a connection with an interface to exchange content with the at least one processor.

11. The storage medium of claim 10, wherein the connection is to be a private network connection.

12. The storage medium of claim 8, wherein the catalog content set is to be organized according to an orderable item data model.

13. The storage medium of claim 8, wherein the instructions, when executed, cause the at least one processor to maintain a subscription to the catalog content set for the at least one tenant system.

14. The storage medium of claim 8, wherein the instructions, when executed, cause the at least one processor to, upon an update, map updated content with respect to the catalog content set.

\* \* \* \* \*

UNITED STATES PATENT AND TRADEMARK OFFICE
CERTIFICATE OF CORRECTION

PATENT NO. : 11,182,737 B2
APPLICATION NO. : 15/978088
DATED : November 23, 2021
INVENTOR(S) : Donald Sepulveda et al.

It is certified that error appears in the above-identified patent and that said Letters Patent is hereby corrected as shown below:

In the Specification

In Column 15, Line 58, delete "410" and insert -- 410. --, therefor.

In Column 17, Line 36, delete "Items" and insert -- items --, therefor.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*